US010600203B2

(12) United States Patent
Glover et al.

(10) Patent No.: US 10,600,203 B2
(45) Date of Patent: Mar. 24, 2020

(54) THREE-DIMENSIONAL SCANNER WITH DETECTOR POSE IDENTIFICATION

(71) Applicant: CapSen Robotics, Inc., Pittsburgh, PA (US)

(72) Inventors: Jared Glover, Pittsburgh, PA (US); Joonwhee Park, Pittsburgh, PA (US); Lauren Zemering, Keller, TX (US)

(73) Assignee: CapSen Robotics, Inc., Pittsburgh, PA (US)

( * ) Notice: Subject to any disclaimer, the term of this patent is extended or adjusted under 35 U.S.C. 154(b) by 316 days.

(21) Appl. No.: 15/615,231

(22) Filed: Jun. 6, 2017

(65) Prior Publication Data

US 2018/0350101 A1    Dec. 6, 2018

(51) Int. Cl.
| | | |
|---|---|---|
| *G06T 7/73* | (2017.01) | |
| *G06T 19/00* | (2011.01) | |
| *G06T 17/20* | (2006.01) | |
| *G06T 7/55* | (2017.01) | |

(52) U.S. Cl.
CPC .............. *G06T 7/74* (2017.01); *G06T 7/55* (2017.01); *G06T 7/73* (2017.01); *G06T 17/20* (2013.01); *G06T 19/006* (2013.01); *G06T 2207/10028* (2013.01); *G06T 2207/10152* (2013.01); *G06T 2207/20221* (2013.01); *G06T 2207/30204* (2013.01); *G06T 2207/30244* (2013.01)

(58) Field of Classification Search
CPC ........... G06T 2207/30244; G06T 17/00; G06T 2200/08; G06T 2207/10028; G06T 2207/20221; G06T 7/33; G06T 7/73; G06T 17/20; G06T 19/006; G06T 2207/10152; G06T 2207/30204; G06T 7/55; G06T 7/74
See application file for complete search history.

(56) References Cited

U.S. PATENT DOCUMENTS

| | | |
|---|---|---|
| 5,850,290 A | 12/1998 | Hariguchi et al. |
| 6,858,826 B2 | 2/2005 | Mueller et al. |
| 7,957,583 B2 | 6/2011 | Boca et al. |

(Continued)

FOREIGN PATENT DOCUMENTS

| | | | |
|---|---|---|---|
| CN | 201431124 Y | * | 3/2010 |
| WO | 2007102667 | | 2/2007 |
| WO | 2010145669 | | 12/2010 |

*Primary Examiner* — Mekonen T Bekele
*Assistant Examiner* — Michael J Vanchy, Jr.
(74) *Attorney, Agent, or Firm* — K&L Gates LLP

(57) ABSTRACT

Three dimensional (3D) scanning including dynamic detector pose identification utilizing fiducials is provided. Two or more fiducials are operatively coupled to a first body. Configuration data is provided with an identifier and a first position of the two or more fiducials. A detector captures 3D data of the first body. A creator identifies at least two fiducials within the captured 3D data. The creator determines a first observed position of each identified fiducial relative to the detector and compares the first observed position to the configuration data. The creator dynamically identifies the pose of the detector relative to the first body based on the comparison and augments the 3D data with first pose data corresponding to the first pose of the detector. The pose of the detector relative to the body may be undefined and/or unknown during the capture of 3D data without affecting the quality of the model produced from the captured 3D data.

25 Claims, 12 Drawing Sheets

(56) References Cited

U.S. PATENT DOCUMENTS

| | | |
|---|---|---|
| 8,625,854 B2 | 1/2014 | Valkenburg et al. |
| 9,332,243 B2 | 5/2016 | Klusza et al. |
| 9,364,995 B2 | 6/2016 | Roberts et al. |
| 9,418,424 B2 | 8/2016 | Goodman et al. |
| 9,456,187 B1 | 9/2016 | Liu et al. |
| 9,589,362 B2 | 3/2017 | Sarkis et al. |
| 2003/0218607 A1* | 11/2003 | Baumberg ............... G06T 15/20 345/419 |
| 2009/0322671 A1* | 12/2009 | Scott ........................ G06K 9/32 345/156 |
| 2013/0176399 A1 | 6/2013 | Rothenbuhler et al. |
| 2015/0054918 A1 | 2/2015 | Lee et al. |
| 2015/0145966 A1* | 5/2015 | Krieger ................... G06T 17/20 348/47 |
| 2015/0199560 A1* | 7/2015 | Gokturk ................ G06F 16/583 382/195 |
| 2015/0332459 A1* | 11/2015 | Znamenskiy .......... G06K 9/228 348/136 |
| 2016/0212412 A1 | 7/2016 | Cox et al. |
| 2017/0337701 A1* | 11/2017 | Jovanovich ............... G06T 7/74 |

\* cited by examiner

THREE-DIMENSIONAL SCANNER WITH
DETECTOR POSE IDENTIFICATION

BACKGROUND

The present embodiments relate to three-dimensional scanning. More specifically, the embodiments relate to dynamic detector pose identification utilizing fiducials.

A three-dimensional (3D) scanning device generates 3D data corresponding to the physical shape, texture, and/or appearance of an object. The 3D data from the 3D scanning device may be used to generate a representation of the object such as a 3D model. The 3D model can be used in a variety of applications, such as industrial design, reverse engineering, robot guidance, topography, medical, criminal identification, video game creation, 3D printing, and object recognition.

Various types of 3D scanning devices exist. The 3D scanning devices may utilize a physical contact method (e.g., coordinate measuring machine) or a non-contact method (e.g., stereo camera, laser range finder, etc.) to capture the 3D data. It is understood that different devices and associated methods have corresponding attributes that affect the quality of the 3D data and in turn the quality of the generated 3D model.

SUMMARY

A system and method are provided for 3D scanning to generate a model, with the 3D scanning including dynamic detector pose identification utilizing fiducials.

In one aspect, a system is provided with one or more components and/or tools for 3D scanning, including a body, a detector, and a creator. Two or more fiducials are operatively coupled to the body. Each fiducial is positioned relative to the body in a first position, and each fiducial has an identifier. Configuration data is provided with the identifiers and the first position(s). The detector is in a first pose relative to the body, and is configured to capture a first data of the body. In addition, the creator is operatively coupled to the detector and the configuration data. The creator identifies at least two fiducials, including the identifier of each fiducial, within the captured first data. The creator determines a first observed position of each identified fiducial relative to the detector. The creator identifies the first pose of the detector relative to the body based on a comparison of the first observed positions to the configuration data and the first position(s) based on the identifier of the at least two fiducials. The creator generates first pose data based on the identified first pose, and in addition the creator augments the first data with the generated first pose data.

In another aspect, a method is provided for 3D scanning utilizing one or more components and/or tools including a body and a detector. Two or more fiducials are operatively coupled to the body. Each fiducial is positioned in a first position relative to the body, and each fiducial has an identifier. Configuration data is arranged with the identifiers and the first position(s). First data of the body is captured, by a detector in a first pose relative to the body. At least two fiducials, including an identifier of each fiducial, are identified within the captured first data. A first observed position of each identified fiducial relative to the detector is determined. The first pose of the detector relative to the body is identified based on a comparison of the determined first observed position to the configuration data and the first position(s) based on the identifier of each fiducial. The first pose of the detector relative to the body is identified based on the comparison. First pose data based on the identified first pose is generated and in addition augmented to the first data.

In yet another aspect, a method is provided for 3D scanning utilizing one or more components and/or tools including a body and a detector. Two or more fiducials are operatively coupled to the body. Each fiducial is positioned in a first position relative to the body, and each fiducial has an identifier. Configuration data is arranged with the identifiers and the first position(s). A detector having a first parameter captures a first data of the body in a first pose relative to the body and a second data of the body in a second pose relative to the body. At least two fiducials, including an identifier of each fiducial, are identified within each data. An observed position of each identified fiducial relative to the detector is determined within each data. The determined observed pose of the detector relative to the body is identified based on a comparison of the determined observed position of each identified fiducial to the configuration data and the first position based on the identifier of each identified fiducial. The first pose of the detector relative to the body is identified based on the comparison. First pose data based on the identified first pose is generated and in addition augmented to the first data. A first model is generated from the first and second data utilizing the first and second poses including generating a first score. The parameter value is dynamically adjusted. More specifically, a second model is generated from the first and second data utilizing the first and second poses and the dynamically adjusted parameter value including generating a second score. The dynamic adjustment ceases in response to a comparison of the first and second scores meeting or exceeding a first threshold.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in Which:

DETAILED DESCRIPTION

Figure 1:
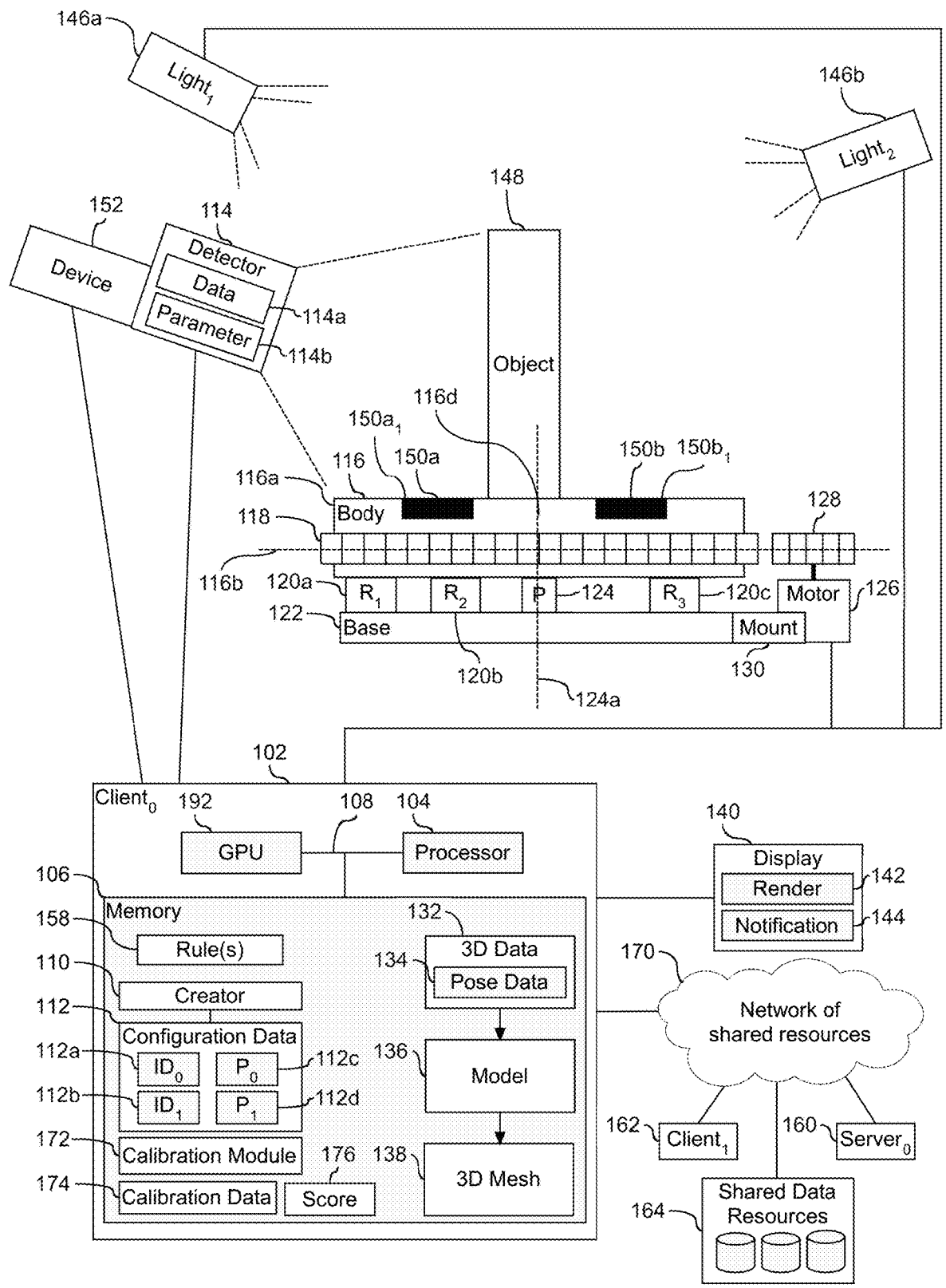
FIG. 1 depicts a block diagram illustrating a system and associated tools to capture three-dimensional (3D) data of a body and/or object.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and illustrates certain selected embodiments of devices, systems, and processes that are consistent with the embodiments as claimed herein.

Three-dimensional (3D) data of an object are processed and employed to generate a model of the object. The model may be generated based on a pre-defined pose (e.g., position and orientation) of the detector. It is understood that the detector pose may be subject to change, either intentionally or unintentionally. Regardless of the intent, the change of the detector pose may be translated into the generated model. An improper translation may cause an error and/or other surface discontinuity in the generated model which results in poor model quality.

To mitigate error(s) and surface discontinuity in the generated model, a system, and method, are disclosed and described herein for 3D scanning that includes a dynamic detector pose identification utilizing fiducials. Two or more fiducials are operatively coupled to a body. Each fiducial has an associated identifier. Configuration data is provided with the associated identifiers and a first position of the two or more fiducials. A detector functions to capture 3D data of the body. At least two fiducials within the captured 3D data are identified. A first observed position of each identified fiducial relative to the detector is determined and compared to the configuration data. In one embodiment, the pose of the detector relative to the body is not ascertained prior to the 3D data capture. More specifically, the pose of the detector is dynamically identified based on the comparison of observed positions to the configuration data. Detector pose data is generated based on the identified pose, and the pose data is augmented to the 3D data. The augmented 3D data is utilized in creation of a model. In one embodiment, augmenting the pose data to the 3D data provides accurate and efficient model generation. Accordingly, the pose of the detector relative to the body may be undefined and/or unknown during 3D data capture without affecting the quality of the model produced from the 3D data.

Referring to FIG. 1, a block diagram (100) is provided illustrating a system and associated tools to capture 3D data of a body and/or object. In the system shown herein, two or more client machines, a server, and shared resources are in communication across a network. A client machine, $client_0$ (102) is shown configured with a processor (104) in communication with a memory (106) across a bus (108). In one embodiment, $client_0$ (102) includes a graphics processing unit (GPU) (192) in communication with the memory (106) across the bus (108). System tools for pose identification within captured 3D data, as shown, are embedded in $client_0$ (102), although in one embodiment the system tools may be provided on another machine in the network. Details of the system tools are described below. In addition to the system tools, $client_0$ (102) is shown in communication hardware components configured for 3D data capture such as detector (114). The detector (114) may be, but is not limited to, a laser range finder, a stereo camera, a camera, a camera and distance sensor pair, and a structured light camera. The detector (114) may include a sensor such as, but not limited to, a complementary metal oxide semiconductor (CMOS) sensor, a charge-coupled device (CCD) sensor, and a microbolometer. In one embodiment, $client_0$ (102) is operatively coupled to one or more lights (146a) and (146b), a motor (126), and a visual display (140). In one embodiment, $client_0$ (102) is operatively coupled to a manufacturing device (not shown) (e.g., 3D printer). In one embodiment, the system tools and/or hardware components are accessible to other devices through a network connection. For example, $client_0$ (102) is shown in communication with a network of shared resources (170) across a network connection to access shared resources, including, but not limited to, shared data resources (164), another client machine, $client_1$ (162), and server, $server_0$ (160). The quantity of client machines, servers, and data resources shown and described herein are for illustrative purposes and should not be considered limiting.

As shown, body (116) is in communication with the detector (114). The body may be, but is not limited to, a table, a platform, and a stage. The body (116) is shown provided with at least two fiducials, including $fiducial_0$ (150a) and $fiducial_1$ (150b), to support pose identification of detector (114) relative to the body (116). Each fiducial, $fiducial_0$ (150a) and $fiducial_1$ (150b) is configured with an identifier, referred to herein as $identifier_0$ and $identifier_1$, respectively, that can be captured by detector (114). The identifier is a characteristic of the associated fiducial which can be ascertained from the fiducial captured by detector (114) (e.g., black and white pattern, color pattern, geometric feature, or other feature). In one embodiment, the fiducial may be, but is not limited to, a tag, a marker, a label, a badge, a tab, a stub, a flag, and a designation. For example, the fiducial may be, but is not limited to, an augmented reality (AR) tag, a data matrix, a maxicode, a quick response (OR) code, an intersense marker, a barcode, a radio-frequency identification (RFID) tag, a light emission feature (e.g., light emitting diode), and a physical feature (e.g., Braille). The fiducial may be two-dimensional or three-dimensional. Each fiducial, $fiducial_0$ (150a) and $fiducial_1$ (150b) may be a different type, size, and/or resolution. In one embodiment, $identifier_0$ and $identifier_1$ of fiducials, $fiducial_0$ (150a) and $fiducial_1$ (150b), respectively, is unique. The identifiers shown and described herein are for illustrative purposes and should not be considered limiting. Accordingly, the quantity and configuration of fiducials should not be considered limiting.

Each fiducial, fiducial$_0$ (150$a$) and fiducial$_1$ (150$b$) is provided in communication with and/or operatively coupled to the body (116). For example, fiducial$_0$ (150$a$) is configured in a first position relative to the body (116) and a second position relative to detector (114). Similarly, fiducial$_1$ (150$b$) is configured in a third positioned relative to the body (116) and a fourth positioned relative to the detector (114). It is understood that the fiducials (150$a$) and (150$b$) are fixed relative to the body (116). In one embodiment, each fiducial$_0$ (150$a$) and fiducial$_1$ (150$b$) is in physical contact with body (116). In another embodiment, each fiducial, fiducial$_0$ (150$a$) and fiducial$_1$ (150$b$), is embedded in body (116). However, the position of the fiducials may change based on movement of another component in the system. For example, the second position of fiducial$_0$ (150$a$) and the fourth position of fiducial$_1$ (150$b$) are subject to change responsive to movement of the detector (114) and/or body (116). In one embodiment, the first position of fiducial$_0$ (150$a$) and the third position of fiducial$_1$ (150$b$) are constant during movement of the body (116) and/or detector (114). Accordingly, the first and third positions of fiducial$_0$ (150$a$) and fiducial$_1$ (150$b$) remain constant relative to the body (116) and the second and fourth positions of fiducial$_0$ (150$a$) and fiducial$_1$ (150$b$) are subject to change relative to the detector (114).

The body (116) is configured to support an object (148) in a first position with respect to the body (116), and to maintain the first position of the object (148) during movement of the body (116) and/or detector (114). The first position of the object (148) may be centered with respect to the body (116), off-center with respect to the body (116), and/or rotated with respect to the body (116). In one embodiment, the object (148) is positioned proximal to centroid (116$d$) of body (116). In one embodiment, the body (116) is in direct physical contact with the object (148). Similarly, the body (116) may be configured with one or more boundaries defined relative to one or more fiducials, including boundary$_0$ (150$a_1$) relative to fiducial$_0$ (150$a$) and boundary$_1$ (150$b_1$) relative to fiducial$_1$. In one embodiment, the object (148) is positioned between the boundaries, boundary$_0$ (150$a_1$) and boundary$_1$ (150$b_1$).

In one embodiment, body (116) is supported by a pivot (124) which is operatively coupled to and supported by a base (122). The pivot (124) is positioned proximal to the body (116) and the pivot (124) is configured to facilitate rotation and/or movement of the body (116) around an axis (124$a$), shown herein as perpendicular to a plane (116$b$) of the body (116). The pivot (124) is in direct physical contact with the body (116) and enables the body (116) to rotate independently of base (122) and in one embodiment, independently of pivot (124). For example, responsive to a force (e.g., torque) applied to the body (116) in plane (116$b$), the body (116) rotates around the axis (124$a$) and in one embodiment, while the base (122) remains stationary. In one embodiment, the body (116) is enabled to rotate around axis (124$a$) in a continuous manner in the same direction (e.g., clockwise or counterclockwise) without restriction. Accordingly, the body (116) is supported by pivot (124) and movement of body (116) is enabled by pivot (124)

The body (116) is provided in communication with a plurality of rollers, (120$a$), (120$b$), and (120$c$) and in one embodiment, body (116) is in direct physical contact with rollers (120$a$)-(120$c$). The rollers (120$a$)-(120$c$) are operatively coupled to the base (122). In one embodiment, the rollers (120$a$)-(120$c$) are operatively coupled to body (116).

The rollers (120$a$)-(120$c$) support a position of and maintain stability of body (116). Each roller (120$a$)-(120$c$) provides one or more points of contact with the body (116) to transfer weight from the body (116) to the base (122). The rollers (120$a$)-(120$c$) limit position changes of the body (116) outside of the plane (116$b$) and facilitate rotation of body (116) around axis (124$a$). In one embodiment, rollers (120$a$)-(120$c$) are ball wheels. Accordingly, the rollers (120$a$)-(120$c$) maintain stability of body (116) while enabling movement of body (116) around axis (124$a$).

In one embodiment a plurality of teeth (118) are positioned in communication with a perimeter (116$a$) of body (116). In one embodiment, the teeth (118) are physically attached to the body (116). The teeth (118) are configured to communicate with gear (128) of motor (126). More specifically, the motor (126) exerts a force onto the gear (128) causing the gear (128) to move. In one embodiment, the movement of the gear (128) is a rotation corresponding to a rotation of an output shaft of the motor (126). The gear (128) is configured to engage the teeth (118) and transfer rotational force from motor (126) to the teeth (118) causing the body (116) to rotate around pivot (124). The rotation of body (116) causes items in contact with the body (116) to be subject to movement, including the fiducials, fiducial$_0$ (150$a$) and fiducial$_1$ (150$b$), and object (148). In one embodiment, the body (116) is rotated manually without the use of motor (126). Accordingly, the body (116) is provided with the teeth (118) to support automated movement of the body (116).

The pose (e.g., position and orientation) of the detector (114) relative to the body (116) may be subject to change. In one embodiment, the detector (114) is configured to change pose in three degrees of freedom relative to the body (116). In one embodiment, the detector (114) is configured to change pose in six degrees of freedom relative to the body (116). The degrees of freedom may be, but are not limited to, forward/backward (e.g., change in an X coordinate), left/right (e.g., change in a Y coordinate), up/down (e.g., change in a Z coordinate), pitch (e.g., a rotation in an X-Z plane), yaw (e.g., a rotation in an X-Y plane), and roll (e.g., a rotation in a Y-Z plane). In one embodiment, detector (114) is in communication with a robotic device (152) which is configured with functionality to support and facilitate movement of the detector (114) relative to body (116). Movement of the detector (114) changes the position of the detector (114) relative to body (116). More specifically, movement of the detector (114) changes the second and fourth positions of fiducial$_0$ (150$a$) and fiducial$_1$ (150$b$). In one embodiment, the movement of the detector (114) does not affect the first and third positions of fiducial$_0$ (150$a$) and fiducial$_1$ (150$b$). In one embodiment, movement of the detector (114) is manual. In one embodiment, movement of the body (116) by motor (126) and/or the movement of detector (114) by robotic device (152) are continuous, or in another embodiment intermittent (e.g. non-continuous). For example, movement is continuous from a first time, time$_0$, before the capture of 3D data. (132) to a second time, time$_1$, after the capture of second data (not shown), with the second time, time$_1$, being after the first time, time$_0$. Accordingly, the detector (114) is subject to manual and/or automatic movement which can be continuous and/or intermittent.

As shown, the detector (114) is configured to capture (e.g., generate) data (114$a$) corresponding to the physical configuration, texture, and/or appearance of the body (116) and/or object as observed by the detector (114) from a pose of the detector (114) relative to the body (116). In one embodiment, data (114$a$) is 3D data. The 3D data may be, but is not limited to, data which can be used to generate a 3D model. The captured 3D data (114a) includes a representation of at least two fiducials, such as $fiducial_0$ (150a) and $fiducial_1$ (150b). For example, the detector (114) may not need to capture all fiducials present on body (116). However, if fewer than two fiducials are captured within data (114a) an error may be indicated or another data (not shown) may be captured. Accordingly, the detector (114) is enabled to capture 3D data of the body (116), fiducials (150a) and (150b), and/or object (148).

The detector (114) communicates (e.g., outputs) the captured data (114a) to $clients_0$ (102) for storage in memory (106) as 3D data (132). In one embodiment, the 3D data (132) is pixel data coupled with distance data. For example, pixel data coupled with distance data may be two-dimensional pixel data coupled with a distance parameter for each pixel. The two-dimensional pixel data may be, but is not limited to, color (e.g., red, green, blue (RGB) pixel data, and black and white pixel data. In one embodiment, the 3D data (132) is solely distance data (e.g., distance from a first point to a first surface), wherein the position of each point is determined based on the relative position of the point to another point within the 3D data. In one embodiment, the 3D data (132) is a point cloud. A point cloud contains a set of data points defining physical features, textures, and/or appearance of an element, such as body (116) and/or object (148), in a coordinate system. The coordinate system may be, but is not limited to, Cartesian and Polar. For example, in one embodiment, each point in the point cloud may represent a three-dimensional position (e.g., X, Y, and Z coordinate) corresponding to a surface. Accordingly, the detector (114) captures 3D data (114a) corresponding to the physical configuration of body (116) and/or object (148) and communicates the captured 3D data (114a) to $client_0$ (102).

As shown, the memory (106) has one or more embedded system tools, such as creator (110), to support examination of the 3D data (132), with the examination including identification of a fiducial(s) present and/or identified within the 3D data (132). The creator (110) utilizes one or more rule(s) (158) to recognize and/or identify the fiducials within captured data, such as 3D data (132). In one embodiment, the rule(s) (158) includes an algorithm which can be utilized to determine presence of a fiducial and/or position of a fiducial within the data, such as the 3D data (132). For example, in one embodiment, the rule(s) (158) instructs creator (110) to identify a border (e.g., corner) of the fiducial based on a pre-defined feature and to examine the interior of the identified border for a particular pattern or other recognizable feature. Based on the examined pattern or feature, the creator (110), supported by rule(s) (158), determines presence of a fiducial in the data, including an identifier of each present fiducial, and an observed position of each present fiducial relative to the detector (114). The determination of the observed position may include, but is not limited to, an analysis of a size of the fiducial, a position and/or orientation of a fiducial relative to another fiducial and/or the captured data, and a distance between fiducials. Accordingly, rule(s) (158) supports identification of fiducials within the 3D data (132).

The creator (110), as shown, is provided in communication with configuration data (112) to support identification of the pose of the detector (114) based on the 3D data (132). Configuration data (112) corresponds to identifiers and positions of fiducials, such as $fiducial_0$ (150a) and $fiducial_1$ (150b), on body (116). For example, configuration data is shown herein with at least two identifiers, $ID_0$ (112a) and $ID_1$ (112b), corresponding to two or more fiducials. In one embodiment, each identifier in configuration data (112) is unique. In one embodiment, $ID_0$ (112a) corresponds to $identifier_0$ of $fiducial_0$ (150a) and $ID_1$ (112b) corresponds to $identifier_1$ of $fiducial_1$ (150b). Each identifier $ID_0$ (112a) and $ID_1$ (112b) is associated with corresponding position data, $P_0$ (112c) and $P_1$ (112d), respectively. Position data. $P_0$ (112c) and $P_1$ (112d) may be, but is not limited to, a position and/or orientation of one fiducial relative to another fiducial, a distance between fiducials, and a position and/or orientation of a fiducial within a three-dimensional representation (e.g., model, volumetric representation, etc.). Configuration data (112) may be created by manual input of the identifiers $ID_0$ (112a) and $ID_1$ (112b) and corresponding position data $P_0$ (112c) and $P_1$ (112d), respectively. In one embodiment, configuration data (112) is created by an automated process utilizing the 3D data (132) captured from detector (114) and application of a configuration rule within rule(s) (158). In one embodiment, configuration data (112) is a file. Accordingly, the configuration data (112) supports the creator (110) by providing identifiers and corresponding position of the fiducials.

The creator (110), supported by the configuration data (112), is configured to identify the pose of the detector (114) relative to the body (116) based on the Observed position and the corresponding identifier of each fiducial. The pose identification includes ascertaining if the identifier of an identified fiducial within the 3D data (132) corresponds to (e.g., matches) an identifier in the configuration data (112). Upon a determination of at least two identifiers present in the configuration data (112) that match two or more identifiers in the 3D data (132), the creator (110) compares the observed positions of the identifiers of the identified fiducials to position data, such as (112c) and (112d), of the respective matching identifiers, such as (112a) and (112b), in the configuration data (112). Based on the comparison, a spatial transformation is generated that aligns the 3D data (132) with the configuration data (112). The spatial transformation defines the pose of the detector (114) relative to the body (116). The spatial transformation may include a translation, a rotation, a scaling, a shear mapping, a data interpolation, a smoothing technique, and/or other transformation. The creator (110) generates pose data (134) from the spatial transformation and augments the 3D data (132) with the pose data (134). Accordingly, the creator (110) identifies fiducials within the 3D data (132) and determines the pose of the detector (114) when the 3D data (132) was captured.

The creator (110) utilizes one or more 3D data (132) augmented with the pose data (134) to generate a model (136). The model (136) is a representation of the body (116) and/or object (148) based on the 3D data (132) captured from the detector (114). More specifically, the model (136) represents the physical configuration, texture, and/or appearance of body (116) and/or object (148). In one embodiment, the model (136) is a collection of 3D coordinates (e.g., points). A model generation process, as shown and described in FIG. 4 below, stitches together the captured 3D data (132) augmented with the pose data (134). In one embodiment, the stitching process includes population of a 3D grid comprising a plurality of voxels. For example, in one embodiment, an origination point for population of the 3D grid is determined for each 3D data (132) based on the pose data (134). Thereafter, the 3D data (132) is transformed into a model (136), as shown and described in FIG. 4 below. In one embodiment, the GPU (192) supports processing of 3D data (132) and/or the generation of the model (136). Accordingly, the quantity of 3D data utilized to create the model should not be considered limiting.

The creator (136) utilizes the model (136) to generate a 3D mesh (138) that defines the physical configuration, texture, and/or appearance of an element such as body (116) and/or object (148). The 3D mesh (138) may include, but is not limited to, a vertex, an edge, a face, and a surface. The face may be, but is not limited to, a triangle and other polygon types. The 3D mesh (138) may be created by computational geometry and/or implicit surface techniques. For example, the 3D mesh may be created by a technique such as, but not limited to, Poisson Surface Reconstruction, Delauney Triangulation, Marching Cubes, Ball Pivoting Algorithm, and Multi-level Partition Unity. The 3D mesh (138) may be rendered and displayed on visual display (140) as render (142). In one embodiment, the render (142) is a visual representation of the physical configuration, texture, and/or appearance of body (116) and/or object (148) as surfaces. Accordingly, the 3D mesh (138) represents the physical configuration, texture, and/or appearance of the body (116) and/or object (148) as observed by detector (114).

As shown, the creator (110) is in communication with detector (114), and in one embodiment, light$_1$ (146a) and light$_2$ (146b), motor (126), and visual display (140) in order to resolve exceptions in data, such as the 3D data (132). The creator (110) evaluates the 3D data (132) in order to identify a data exception in the 3D data (132). For example, the data exception may be, but is not limited to, a speed of the first body relative to the detector meeting or exceeding a speed threshold, the pose of the detector meeting or exceeding a pose threshold, a position of the object (148) relative to the detector (114), and the detector field of view (FOV) relative to the object (148) meeting or exceeding a FOV threshold. Based on the identified exception, the creator (110) may resolve the data exception and/or present a notification on the visual display (140) based on the identified data exception. The resolution may include adjusting a parameter associated with motor (126), detector (114), light$_1$ (146a) and light$_2$ (146b), and/or robotic device (152). For example, if the FOV of the detector (114) relative to the object (148) meets or exceeds a threshold (e.g., object (148) is not completely within the FOV of detector (114)), the creator (110) may instruct the robotic device (152) to adjust the pose of the detector (114) relative to the object (148) to be below the FOV threshold. Similarly, in one embodiment, a notification may be displayed that includes a message to "adjust the position of the object" and/or "adjust the position of the detector." The data exceptions, including the speed threshold, pose threshold, and FOV threshold may be stored in rule(s) (158). Accordingly, the creator (110) may identify exceptions in the 3D data (132) utilizing rule(s) (158).

As shown, the creator (110) may resolve exceptions in the model (136) and/or the 3D mesh (138). The creator (110) evaluates the model (136) and and/or the 3D mesh (138) in order to identify a model exception in the model (136) and/or the 3D mesh (138). The model exception may be, but is not limited to, a gap within the model (136) and/or 3D mesh (138), a misalignment of two more 3D data (132) within the model (136), a protrusion or hole within the model (136) and/or 3D mesh (138) meeting or exceeding a distance threshold, a quality parameter of the model (136) and/or 3D mesh below a quality threshold, and a quantity of the 3D data (132) utilized to generate the model (136) and/or 3D mesh (138). The model exceptions may be stored in rule(s) (158).

Responsive to the identification of the model exception, the creator (110) requests the detector (114) to capture additional 3D data. In one embodiment, the creator controls the motor (136) and/or robotic device (152) to position the detector (114) in a select pose for capture of the additional 3D data. For example, the creator (110) may utilize the motor (126) to move the body (116) to a first position where detector (114) is in a select pose relative to the body (116). Similarly, the creator may utilize the robotic device (152) to move the detector (114) to a second position in the select pose relative to the body (116). Accordingly, the creator (110) can automatically move the detector (114) and/or the body (116) in order to position the detector (114) in the select pose relative to the body (116).

The detector (114) captures the second 3D data (not shown) of the body (116) and/or object (148) in the select pose. The creator (110) resolves the identified model exception including generating a second model (not shown) from the second 3D data and the model (136). In one embodiment, the resolution of the identified model exception is automatic. In one embodiment, the resolution of the model exception includes displaying a notification (144) identifying the exception and requesting an action (e.g., move the body (116) and/or detector (114)). In one embodiment, the creator (110) utilizes the second model to generate a second 3D mesh (not shown). Accordingly, the creator (110) is enabled to adjust the body (116) and/or detector (114) in order to automatically resolve model exceptions.

During movement of the body (116) and/or detector (114), the creator (110) may request captured data (114a) in order to determine a quantity and/or direction of movement of the body (116) and/or detector (114). In one embodiment, the determined quantity and/or direction of movement is utilized to provide feedback control of the motor (126) and/or robotic device (152). For example, the creator (110) may determine a spatial translation between different poses of multiple 3D data (132). Based on the determined spatial translations, the creator (110) may dynamically adjust the speed of the motor (126) and/or the robotic device (152). The adjustment of the speed may be a change in a control voltage to the motor (126) and/or the robotic device (152). The speed adjustment in turn affects the movement of the body (116) and/or the detector (114), respectively. In one embodiment, in order to determine a speed, the creator (110) utilizes a timestamp (not shown) corresponding to the time at which each the 3D data (132) was captured and the spatial translation. Accordingly, the creator (110) can determine the speed and/or direction of movement of the body (116) and/or detector utilizing the 3D data (132).

In one embodiment, the creator (110) controls and/or adjusts light (146a) and (146b) in accordance with the rule(s) (158). For example, the rule(s) (158) may define a correspondence between lighting and the pose of the detector (114). The control and/or adjustment of a light source may include, but not limited to, the pose of the light source relative to the body (116), the type of light source, and the intensity of the light source. The type of light source may be, but is not limited to, emitted wavelength(s), color temperature, and emitter type (e.g., Light Emitting Diode, Fluorescent, Incandescent, etc.). In one embodiment, creator (110) determines and/or identities lighting of the body (116) and the object (148) such as, but not limited to, a pose of the light source relative to the body (116), a type of light source, and an intensity of light source. Based on the determined lighting, the creator (110) may adjust the lighting and request the detector (114) to capture a third data of the body (116) utilizing the adjusted lighting. The creator (110) utilizes the third data to generate a new model from model (136) including adjustment of color data in the model (136). Accordingly, the creator (110) can control the lighting of the body (116) and/or object (148) in order to accurately represent the color of the body (116) and/or object (148) in the model (136).

The system shown in FIG. 1 for capturing 3D data is modular. For example, the body (116) may be replaced by a second body (not shown). The second body may be a different size than the first body. The different size may include a changed dimension. The dimension may be, but is not limited to, a thickness, a diameter, a length, a width, and a perimeter. The motor (126) is reconfigurable such that motor (126) may receive a plurality of different bodies, such as second body. A mount (130) is operatively coupled to the motor (126) and the base (122) to support reconfiguration of the motor (126). The modular characteristic of the motor (126) and associated ability of the motor (126) to reconfigure or facilitate reconfiguration enables the motor (126) to support one or more bodies of varying dimensions and types. For example, mount (130) enables the motor (126) to change position in relation to the pivot (124) in order to receive a second body having a different diameter than the body (116). Accordingly, the motor (126) is a modular system component.

Each body, such as body (116) and second body, may be provided with a different arrangement of fiducials. Each body may be enabled to effectively support a select object type. For example, a larger body (e.g., second body) may be used with a larger object, and similarly a smaller body (e.g., body (116)) may be used with a smaller object relative to the larger object. A body with high resolution fiducials may be used to capture higher quality 3D data relative to a body with low resolution fiducials. However, the low resolution fiducials may increase the speed at which the model can be generated by processor (104). In one embodiment, the configuration data (112) is associated with the body (116). In one embodiment, to change from the body (116) to the second body, a second configuration data is selected for use by creator (110). In one embodiment, the configuration data (112) contains identifiers of fiducials from two or more bodies. Accordingly, a body may be selected together with a corresponding configuration data in order to provide attributes that support the 3D data quality desired.

Additionally, the detector (114) may be modular and interchanged for a different detector configuration (e.g., detector type, model, sensor, etc.). Each detector configuration may have different attributes and each detector configuration may output a different 3D data type (e.g., format). In one embodiment, the configuration data (112) is configured independent of the detector (114), and the configuration data (112) may be utilized by the creator (110) to stitch together 3D data from a variety of different detector configurations and 3D data types. For example, configuration data (112) enables creator (110) to generate model (136) from 3D data captured from the detector (114) in a first detector configuration and 3D data captured from a second detector (not shown) in a second detector configuration without re-arranging the configuration data (112). In one embodiment, the first and second detector configurations are different. In one embodiment, detector (114) outputs 3D data in a first format and the second detector outputs 3D data in a second format and the first and second formats are different. In one embodiment, lights, including light$_1$ (146a) and light$_2$ (146b), may be interchanged with a different type and/or model. Accordingly, the creator (110), supported by configuration data (112), provides flexibility to interchange, orient, and/or position the detector (114) and/or body (116).

Client$_0$ (102) is provided with one or more system tools, such as a calibration module (172), to dynamically calibrate a detector, such as detector (114), including functionality to dynamically adjust a detector parameter (114b). In order to determine whether the detector parameter (114b) should be adjusted, the calibration module (172) processes the 3D data (132) utilizing a value of the detector parameter (114b). The detector parameter (114b) may be, but is not limited to, a focal length of a sensor, a FOV, a disparity (e.g., a depth offset), a pixel mapping, a transform, a distortion vector, and a baseline. The pixel mapping may be a relation between a first element (e.g., color sensor, projector, IR sensor, etc.) to a second element within the detector (114). The transform may relate to an algorithm that aligns data and/or an emission of the first element with data and/or an emission of the second element. Accordingly, the calibration module (172) is provided with functionality to dynamically adjust the detector parameter (114b).

In one embodiment, the creator (110), supported by detector (114), generates one or more 3D data (174), hereinafter referred to as calibration data, to be used in the calibration process of detector (114). The creator (110) utilizes the calibration data (174) to create the model (136), and the calibration module (172) creates a model score (176) for the model (136). The model score (176) is based on the quality of the model (136), including the alignment of the calibration data (174) within model (136). The model score (176) and any prior model score(s) (176) are evaluated including a comparison of the model score(s) (176) to a score threshold in rule(s) (158). Based on the comparison of the model score(s) (176) to the score threshold, the calibration module (172) may dynamically adjust the value of the detector parameter (114b). The dynamic adjustment includes the calibration module (172) to change the value of the detector parameter based on rule(s) (158) responsive to the comparison. In one embodiment, the adjustment includes a randomized gradient descent algorithm. For example, the value of the detector parameter is dynamically adjusted to optimize the model score (176) until the value of the detector parameter (114b) converges to a single value or value(s) within a predefined range as defined by rule(s) (158). Accordingly, the calibration module (172) dynamically adjusts the detector parameter (114b) in order to improve the quality of model (136).

Figure 2:
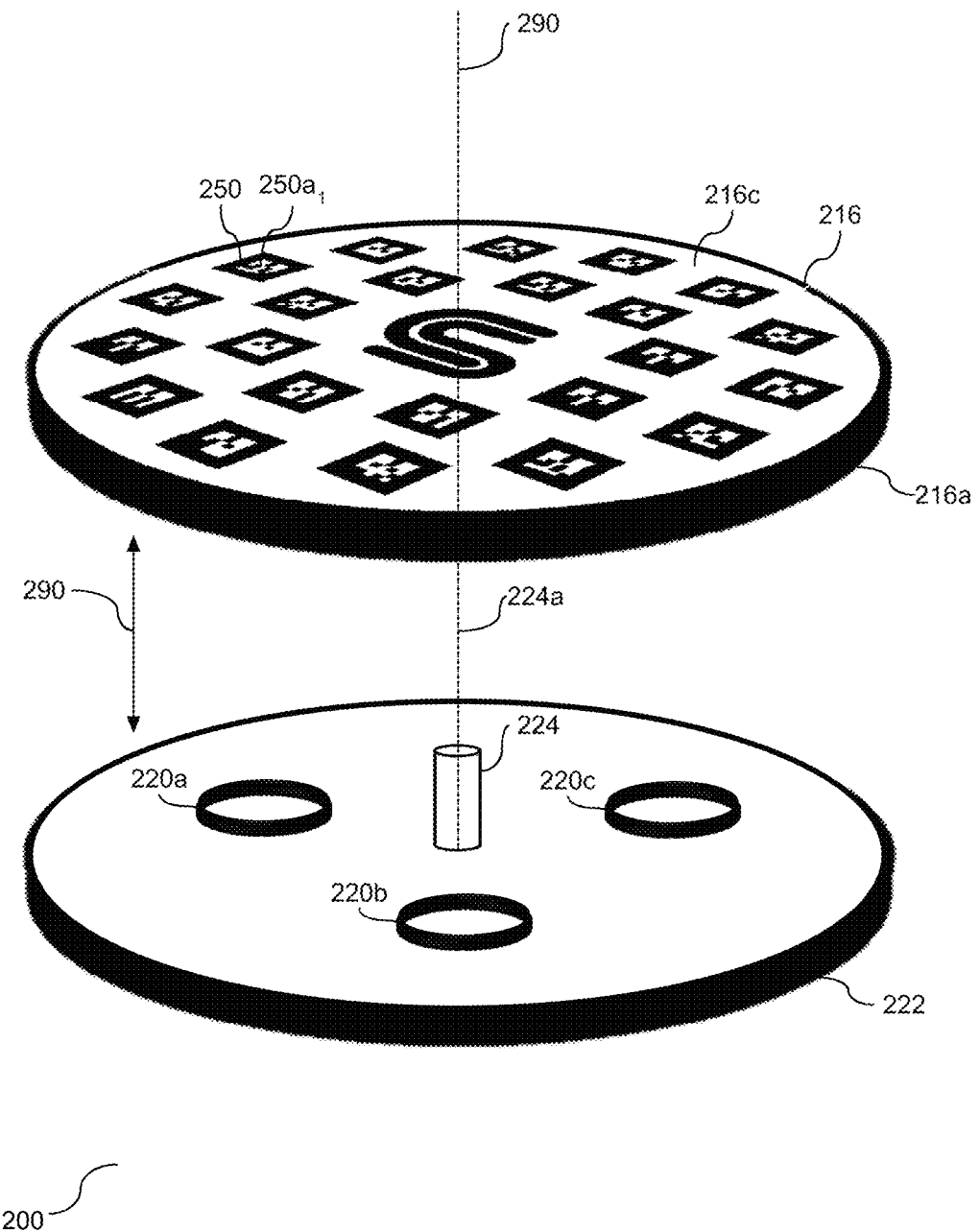
FIG. 2 depicts a block diagram illustrating an exploded view of the body and the base assembly to support the 3D data capture.

Referring to FIG. 2, a block diagram (200) is provided illustrating an exploded view of the body and the base assembly to support the 3D data capture. The direction of the exploded view for the block diagram (200) is indicated by line (290). As shown, a body (216) is provided with a plurality of fiducials (250). Each fiducial (250) is operatively coupled to a surface (216c) of body (216). In one embodiment, the fiducials are in direct physical contact with surface (216c). Each fiducial, (250) is configured with an identifier (250a$_1$) that can be captured by a detector. For example, the identifier (250a$_1$) may be, but is not limited to, a black and white pattern, a color pattern, a geometric feature, and other features. In one embodiment, the body (216) is a disk shape and the fiducials (250) are AR tags. Accordingly, the body (216) is provided with fiducials (250), with each fiducial having an identifier (250a$_1$).

As shown, a perimeter (216a) of the body (216) is configured to receive a force in order to rotate body (216) around pivot (224). For example, the perimeter (216a) may be in direct physical contact with an element such as, but is not limited to, a gear, a wheel, a belt, and a chain. The element may be configured to transfer a rotational force to the perimeter (216a) of body (216) causing the body (216) to rotate around pivot (224) including axis (224a). The pivot (224) is operatively coupled to and supported by a base (222) and the pivot (224) is in communication with the body (216). In one embodiment, the pivot is in direct physical contact with the body (216). The pivot (224) is configured to enable a rotation (e.g., clockwise and/or counterclockwise) of the body (216). In one embodiment, the body (216) may be rotated manually. Accordingly, the body (216) may be rotated by a variety of different means.

The base (222) is provided with a plurality of rollers, such as rollers (220a), (220b), and (220c). The rollers (220a)-(200c) support a position of the body (216) and enable transfer of force between the body (216) and the base (222). The rollers (220a)-(220c) enable the body (216) to rotate around the pivot (224) while limiting a position change of the body (216). In one embodiment, the rollers (220a)-(220c) are co-planar. Similarly, in one embodiment, the rollers (220a)-(220c) are separated at a 120 degree angle from each other. In one embodiment, the rollers (220a)-(220c) are in direct physical contact with the body (216). Accordingly, the body (216) is supported by and enabled to rotate by the rollers (220a)-(220c) and the pivot (224).

Figure 3:
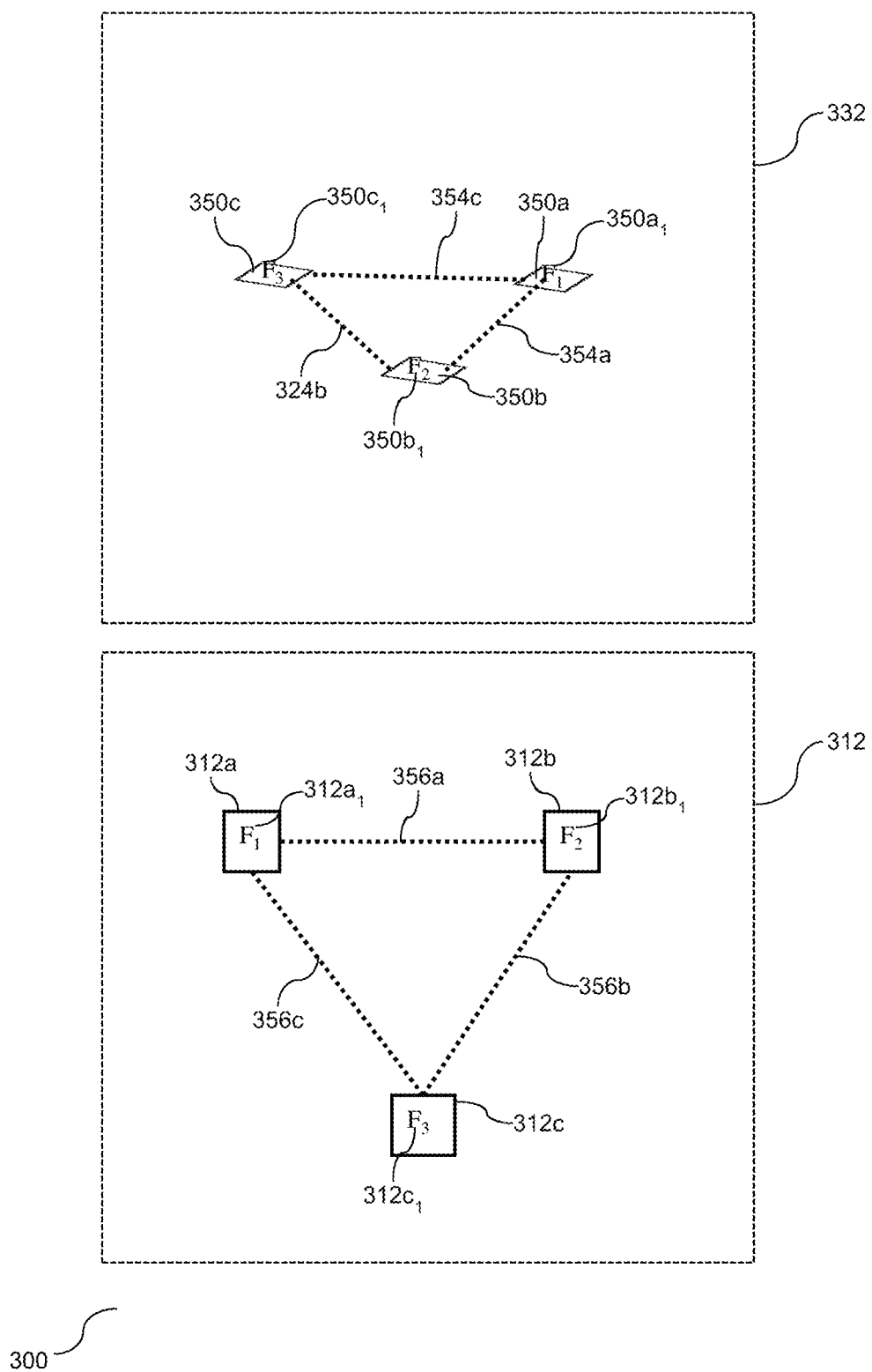
FIG. 3 depicts a block diagram illustrating alignment of 3D data with configuration data.

FIGS. 1-2 illustrate the configuration of the various elements and embodiments of the system to capture 3D data. Referring to FIG. 3, a block diagram (300) is provided illustrating alignment of the 3D data with the configuration data. As shown, the detector captured 3D data (332) of a body and/or object including data of fiducials, shown herein as $fiducial_0$ (350a), $fiducial_1$ (350b), and $fiducial_2$ (350c). In one embodiment, the data is sent to a client machine or server for processing of the 3D data (332). At least two fiducials are recognized in the 3D data (332) utilizing a recognition rule in order to process the 3D data (332) and in one embodiment, generate a model. If fewer than two fiducials are recognized within the 3D data (332), an error may be indicated and/or the process may continue on to a different 3D data (not shown). In one embodiment, the recognition rule includes an algorithm which can be utilized to determine presence of a fiducial such as $fiducial_0$ (350a), $fiducial_1$ (350b), and $fiducial_2$ (350c) within 3D data (332). The recognition rule can also be utilized to determine an identifier of each fiducial. For example, $fiducial_0$ (350a) is provided with $identifier_0$ ($350a_1$), $fiducial_1$ (350b) is provided with $identifier_1$ ($350b_1$), and $fiducial_2$ (350c) is provided with $identifier_3$ ($350c_1$). The representation of the identifiers shown and described herein is for illustrative purposes and should not be considered limiting. Accordingly, a recognition rule is utilized in order to determine whether any fiducial is present in 3D data (332) and the position and identifier of the present fiducial(s).

The observed position of fiducials (350a)-(350c) within the 3D data (332) relative to the detector may be determined by an analysis of, but not limited to, a position and/or orientation of a fiducial relative to another fiducial and/or 3D data (332), and a distance between fiducials. For example, the observed position of $fiducial_0$ (350a) may include, but is not limited to, a distance (354c) from $fiducial_0$ (350a) to $fiducial_2$ (350c), a distance (354a) from $fiducial_0$ (350a) to $fiducial_1$ (350b), and an observed orientation of $fiducial_0$ (350a) with respect to $fiducial_1$ (350b) and/or $fiducial_2$ (350c). Similarly, the Observed position of $fiducial_1$ (350b) may include, but is not limited to, a distance (354a) from $fiducial_1$ (350b) to $fiducial_0$ (350a), a distance (354b) from $fiducial_1$ (350b) to $fiducial_2$ (350c), and an observed orientation of $fiducial_1$ (350b) with respect to $fiducial_0$ (350a) and/or $fiducial_2$ (350c). The observed position of $fiducial_2$ (350c) may include, but is not limited to, a distance (354b) from $fiducial_2$ (350c) to $fiducial_0$ (350a), a distance (354b) from $fiducial_2$ (350c) to $fiducial_1$ (350b), and an observed orientation of $fiducial_2$ (350c) with respect to $fiducial_0$ (350a) and/or $fiducial_1$ (350b). Accordingly, the observed position of each fiducial (350a)-(350c) is determined.

The pose of the detector relative to the fiducials (350a)-(350c) is identified utilizing the observed position(s) of each fiducial (350a)-(350c) and the corresponding identifier ($350a_1$)-($350c_1$) of each respective fiducial. A determination is made to ascertain if the present fiducials (350a)-(350c) within 3D data (332) correspond to (e.g., match) an identifier, $identifier_{0'}$ ($312a_1$), $identifier_{1'}$ ($312b_1$) and/or $identifier_{2'}$ ($312c_1$), of a representation of a fiducial in the configuration data (312). For example, $fiducial_0$ (350a) matches $fiducial_3$ (312a) based on $identifier_0$ ($350a_1$) and $identifier_{0'}$ ($312a_1$) respectively. Similarly, $fiducial_1$ (350b) is determined to match with $fiducial_4$ (312b) based on $identifier_1$ ($350b_1$) and $identifier_{1'}$ ($312b_1$), respectively, and $fiducial_2$ (350c) is determined to match $fiducial_4$ (312c) based on $identifier_2$ ($350c_1$) and $identifier_{2'}$ ($312c_1$), respectively.

The Observed position of each fiducial (350a)-(350c) is compared to the position of the respective matching fiducial (312a)-(312c) in configuration data (312). In one embodiment, distance (354a) is compared to corresponding distance (356a), distance (354b) is compared to corresponding distance (356b), and distance (354c) is compared to corresponding distance (356c). In one embodiment, the observed orientation of the one or more of fiducials (350a)-(350c) is compared to a configuration orientation of one or more of the fiducials (312a)-(312c) with respect to one or more other fiducials (312a)-(312c). Based on the position comparison, a spatial transformation is determined that aligns the 3D data (332) with the configuration data. (312). The spatial transformation defines the pose of the detector relative to the fiducials (350a)-(350c). The spatial transformation may include a translation, a rotation, a scaling, a shear mapping, a data interpolation, a smoothing technique, and/or a transformation. Accordingly, the spatial transformation of the 3D data (332) with respect to the configuration data (312) is determined utilizing recognized fiducials.

In one embodiment, alignment of the 3D data (332) with the configuration data (312) illustrated in FIG. 3 may include utilization of, but not limited to, geometric hashing, random sample consensus (RANSAC), iterative closest point (ICP), point set registration, point matching, procrustean alignment, robust point matching, kernel correlation, coherent point drift, and sorting the correspondence space. The configuration data (312) may be arranged as, but not limited to, a hash table. Accordingly, alignment of the 3D data (332) with the configuration data (312) may be performed by various techniques.

Figure 4:
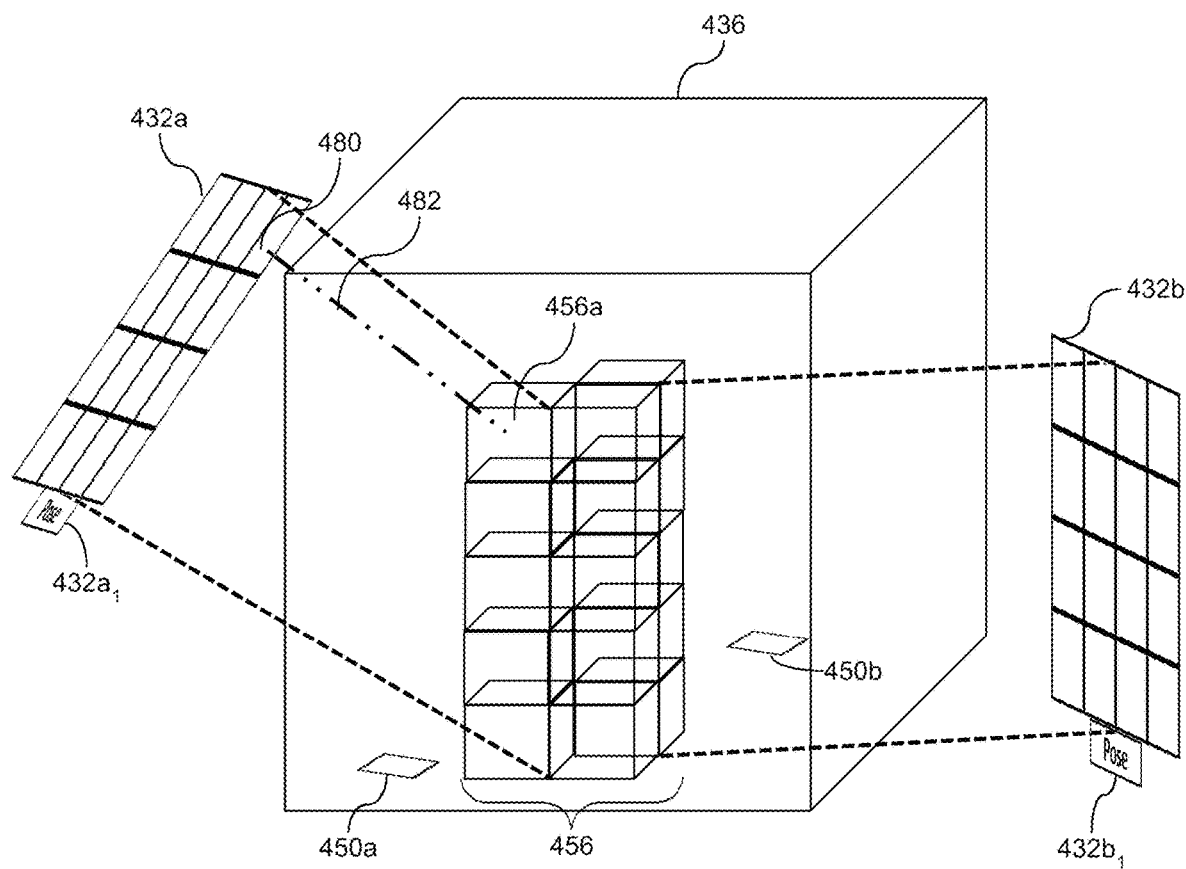
FIG. 4 depicts a block diagram illustrating model creation from the 3D data.

Referring to FIG. 4, a block diagram (400) is provided illustrating model creation from the 3D data. As shown, a model (436) of a body is created from one or more 3D data (e.g., point clouds), such as $3D data_0$ (432a) and $3D data_1$ (432b). The creation of the model (436) may include, but is not limited to, ray casting, a signed distance function, and a truncated signed distance function. In one embodiment, the model (436) is a volumetric representation of the body. The model (436) comprises one or more voxels (456) representing 3D coordinates. Each voxel (456) is an element of the model (436) representing a single data point at a select position within model (436). A voxel may consist of, but is not limited to, probability data (e.g., the likelihood of a surface being present at the position of the voxel), opacity data (e.g., opaqueness of the surface at the position of the voxel), color data (color of the surface at the position of the voxel), and a signed distance value. In one embodiment, the voxel may only have a value for the probability data and may not contain position data. However, the position of the voxel may be inferred from a position of the voxel relative to another voxel(s). In one embodiment, the voxel may have position data. Accordingly, the model (436) may comprise one or more voxels (456) that are a volumetric representation of the body and/or object.

Pose data, ($432a_1$) and ($432b_1$), is augmented to 3D data (432a)-(432b) respectively. The pose data, ($432a_1$) and ($432b_1$), corresponds to a pose of the detector used to capture the point cloud with respect to one or more fiducials, such as $fiducial_0$ (450a) and $fiducial_1$ (450b). In one embodiment, each fiducial (450a)-(450b) may be associated with (e.g., registered to) a select position within model (436). The pose data, $pd_0$ ($432a_1$) and $pd_1$ ($432b_1$) are utilized when populating the model (436) with the 3D data (432a)-(432b). For example, each 3D data (432a)-(432b) is positioned at an origination point and oriented with respect to the model (436) based on the respective pose data $pd_0$ ($432a_1$) and $pd_1$ ($432b_1$). Utilizing the respective origin point, the model (436) is populated with the 3D data (432a)-(432b). For example, in one embodiment, after positioning and orientation of the 3D data, a vector (482) is extended from a first point (480) in 3D $data_0$ (432a) to a first voxel (456a) of model (436). The origin of the first point (480) is based on the origin of the 3D $data_0$ (432a) and a relation of the first point (480) to other points within the 3D data (432a). The magnitude of vector (482) is based on data within first point (480), and the direction of vector (482) is based on the pose augmented to 3D $data_0$ (432a). The first voxel (456a), where the vector (480) ends, is populated with (e.g., added to, incorporated into, etc.) data based on the first point (480). In one embodiment, a voxel(s) positioned adjacent to the first voxel (456a) is additionally populated with data based on the first point (480). In one embodiment, the data populated to the voxel includes a signed distance value generated from a signed distance function based on the first point (480). Similarly, other points within the 3D $data_0$ (432a) and points within 3D $data_1$ (432b) are used to populate other voxel(s) (456) in model (436). Accordingly, the pose data is utilized to find the origination point of the 3D data and to determine a direction of a vector created from a point in the 3D data.

Figure 5:
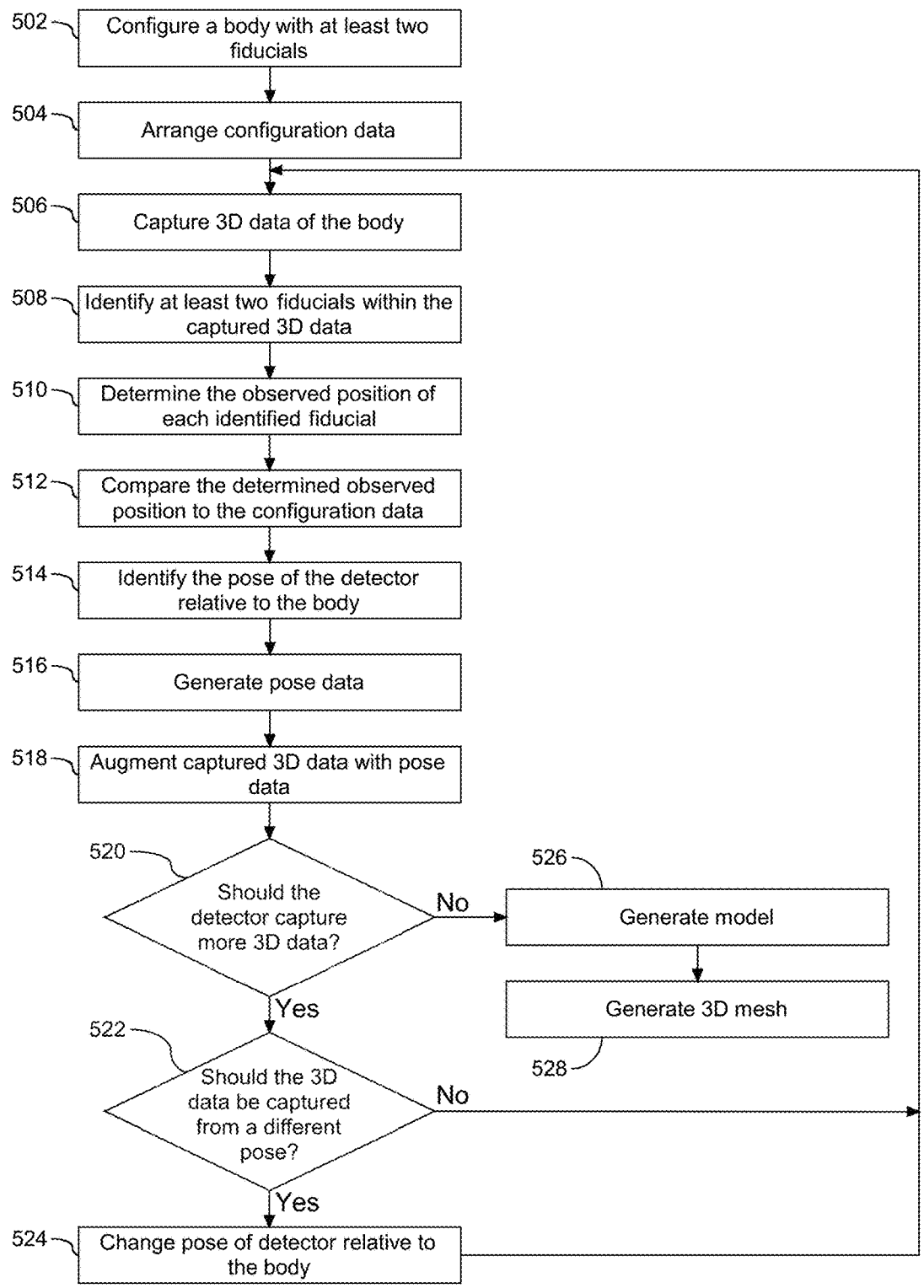
FIG. 5 depicts a flow chart illustrating a method for capturing 3D data.

Referring to FIG. 5, a flow chart (500) is provided illustrating a method for capturing 3D data. As shown, a body is configured with at least two fiducials (502). Each configured fiducial has an identifier. Similarly, each configured fiducial is operatively coupled to the body, and positioned in a first position relative to the body. In one embodiment, the first position of each fiducial is different. In one embodiment, each fiducial has a unique identifier. In one embodiment, the configuration of the body at step (502) includes supporting an object on the body.

As shown, at step (504), configuration data is arranged with the identifier and the first position of the two or more fiducials corresponding to the fiducials configured at step (502). A 3D data of the body is captured utilizing a detector in a select pose relative to the body (506). In one embodiment, the 3D data includes 3D data of the object. In one embodiment, the 3D data is a point cloud. In one embodiment, the data capture at step (506) employs the tools shown and described in the system of FIG. 1. Accordingly, the 3D data of the body and/or object is captured by a detector in the first pose.

Following step (506), at least two fiducials within the captured 3D data are identified (508). The identification at step (508) includes recognition of an identifier of each identified fiducial. The Observed position of each identified fiducial relative to the detector is determined (510). The observed position of each identified fiducial is compared to the configuration data based on the identifier of each identified fiducial (512). Based on the comparison at step (512), the select pose of the detector relative to the body is identified (514) and pose data is generated based on the identified select pose of the detector (516). The pose data is augmented to the 3D data utilized to determine the select pose (518). Accordingly, the pose of the detector is identified utilizing the observed position of fiducials and augmented to the 3D data.

As shown, following step (518) a determination is made if the detector should capture additional 3D data (e.g., point cloud) (520). The process proceeds to step (526) following a negative response to the determination at step (520). However, following a positive response to the determination at step (520), a determination is made to ascertain if the data should be captured from a different pose (522). The pose of the detector relative to the body is changed responsive to positive determination at step (522). More specifically, following a positive response to the determination at step (522), the pose of the detector is changed relative to the body (524). The pose of the detector may be changed by movement of the body and/or detector. Following a negative determination at step (522) or following step (524), the process returns to step (506) to capture additional data. In one embodiment, the data capture at step (506) can occur during movement of the detector and/or the body. In one embodiment, during capturing of 3D data of the body at step (506), the body and/or detector is subject to continuous movement. For example, the body may be subject to a continuous movement from a first time before the capture of a first 3D data to a second time after the capture of a second 3D data, where the first time is before the second time. In one embodiment, the data capture at step (506) can occur while the detector and/or the body are stationary. Accordingly, the quantity of 3D data captured should not be considered limiting.

As shown, following a negative determination at step (520) a model is generated from the captured 3D data utilizing the pose data augmented to each 3D data (526). In one embodiment, each 3D data is added to the model based on associated the pose data. A 3D mesh is created from the generated model (528). The 3D mesh may be displayed and/or exported in a 3D file format. Accordingly, a 3D mesh may be generated from a plurality of 3D data captured from a plurality of poses without predefining or predetermining the pose of the detector.

Figure 6:
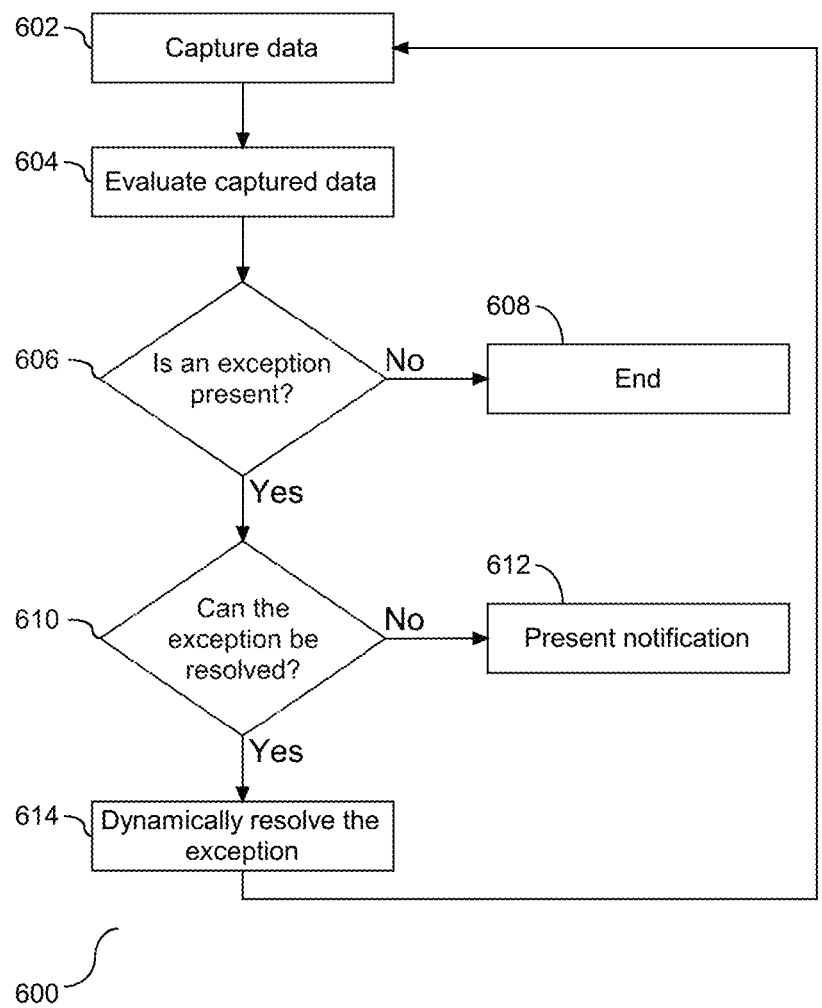
FIG. 6 depicts a flow chart illustrating a method for resolving an exception in the 3D data.

Referring to FIG. 6, a flow chart (600) is provided illustrating a method for resolving an exception in the 3D data. As shown, data of the body and/or the object is captured from the detector in a select pose (602). In one embodiment, the captured data is a point cloud. In one embodiment, step (602) follows step (504) of FIG. 5. The captured data is evaluated (604) and a determination is made if an exception is present in the captured 3D data (606). In one embodiment, the determination at step (606) includes an identification of a present exception. The exception may be, but is not limited to, a speed of the body relative to the detector meeting or exceeding a speed threshold, a pose of the detector meeting or exceeding a pose threshold, a position of the object relative to the detector, and the detector FOV relative to the object meeting or exceeding a FOV threshold. Following a negative response to the determination at step (606) the process either concludes (608), or in one embodiment continues to step (508) of FIG. 5. Accordingly, the 3D data is evaluated in order to determined presence of exception(s).

However, following a positive response to the determination at step (606), a determination is made if the exception can be resolved (610). The determination at step (610) includes determining if a resolution procedure is available to handle the exception (e.g., an exception rule including instructions to handle the exception). Following a negative response to the determination at step (610) a notification is presented on a visual display based on the exception (612). However, following a positive response to the determination at step (610), the exception is dynamically resolved (614). The resolution may include adjustment of an element of the computer system. The element may be a parameter associated with, a motor which controls movement of the body, the detector, a light illuminating the body and/or object, and/or a robotic device which controls movement of the detector. Following resolution of the exception at step (614), the process returns to step (602) to capture data to complete the exception resolution process. Accordingly, an exception in the 3D data is identified and dynamically resolved.

Figure 7:
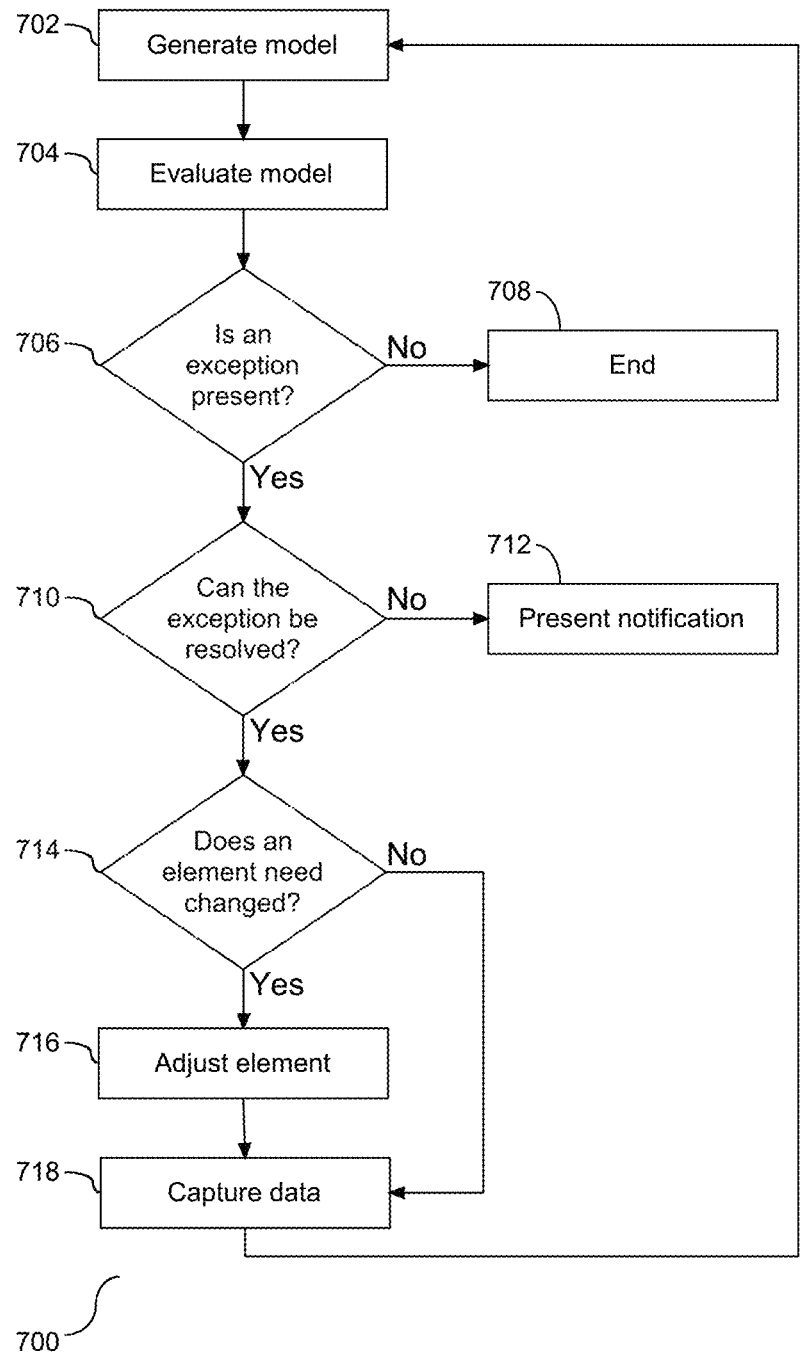
FIG. 7 depicts a flow chart illustrating a method for resolving an exception in the model.

Referring to FIG. 7, a flow chart (700) is provided illustrating a method for resolving an exception in the model. As shown, the model is generated from one or more data (702). In one embodiment, step (702) follows a negative response to step (520) of FIG. 5. The generated model is evaluated (704). In one embodiment, a generated 3D mesh is evaluated at step (704). In one embodiment, the evaluation at step (704) includes a determination of lighting and/or a color of the model. The lighting may be, but is not limited to, a pose of a light source relative to the body, a type of light source, and an intensity of light source. A determination is made if an exception is present in the model and in one embodiment, the exception is identified (706). The exception at step (706) may be, but is not limited to, a gap within the generated model, a misalignment of two or more 3D data within model, a protrusion or hole within model meeting or exceeding a distance threshold, a quality parameter of the model below a quality threshold, a quantity of 3D data utilized to generate the model, lighting, and a color of the model. Following a negative response to the determination at step (706) the process concludes (708) and/or in one embodiment, continues to step (528) of FIG. 5. Accordingly, the model and/or 3D mesh are evaluated in order to determine presence of one or more exceptions.

Following a positive determination at step (706), it is determined if the exception can be resolved (710). The determination at step (710) includes determining if a resolution procedure is available to handle the exception (e.g., an exception rule including instructions to handle the exception). If it is determined that the exception cannot be resolved, a notification indicating the status of the exception is generated and presented on a visual display (712). However, following a determination that the exception can be resolved at step (710), it is determined if an element of the system needs changed and in one embodiment, the element is identified (714). For example, the pose of the detector relative to the body may be identified as the element subject to change, and the pose of the detector may be adjusted to facilitate resolution of the exception. Similarly, the lighting may be identified as the element subject to change, and the lighting may be adjusted to facilitate resolution of the exception. Following a positive response at step (714), the identified element is adjusted (716). In one embodiment, the pose of the detector relative to the body is the identified element at step (716) and the body is moved from a first position to a second position relative to the detector and/or the detector is moved from a first position to a second position relative to the body. In one embodiment, the lighting is the identified element at step (716), and at least one of the following is adjusted, the pose of the light source relative to the body, the type of light source, and the intensity of light source. Following the adjustment of the element at step (716) or a negative determination at step (714), the process proceeds to capture 3D data in order to complete resolution of the exception (718). Following capture of the 3D data at step (718), the process returns to step (702) to generate a new model utilizing the prior model and the new captured data from step (718). Accordingly, an exception present in the model is identified and dynamically resolved.

Figure 8:
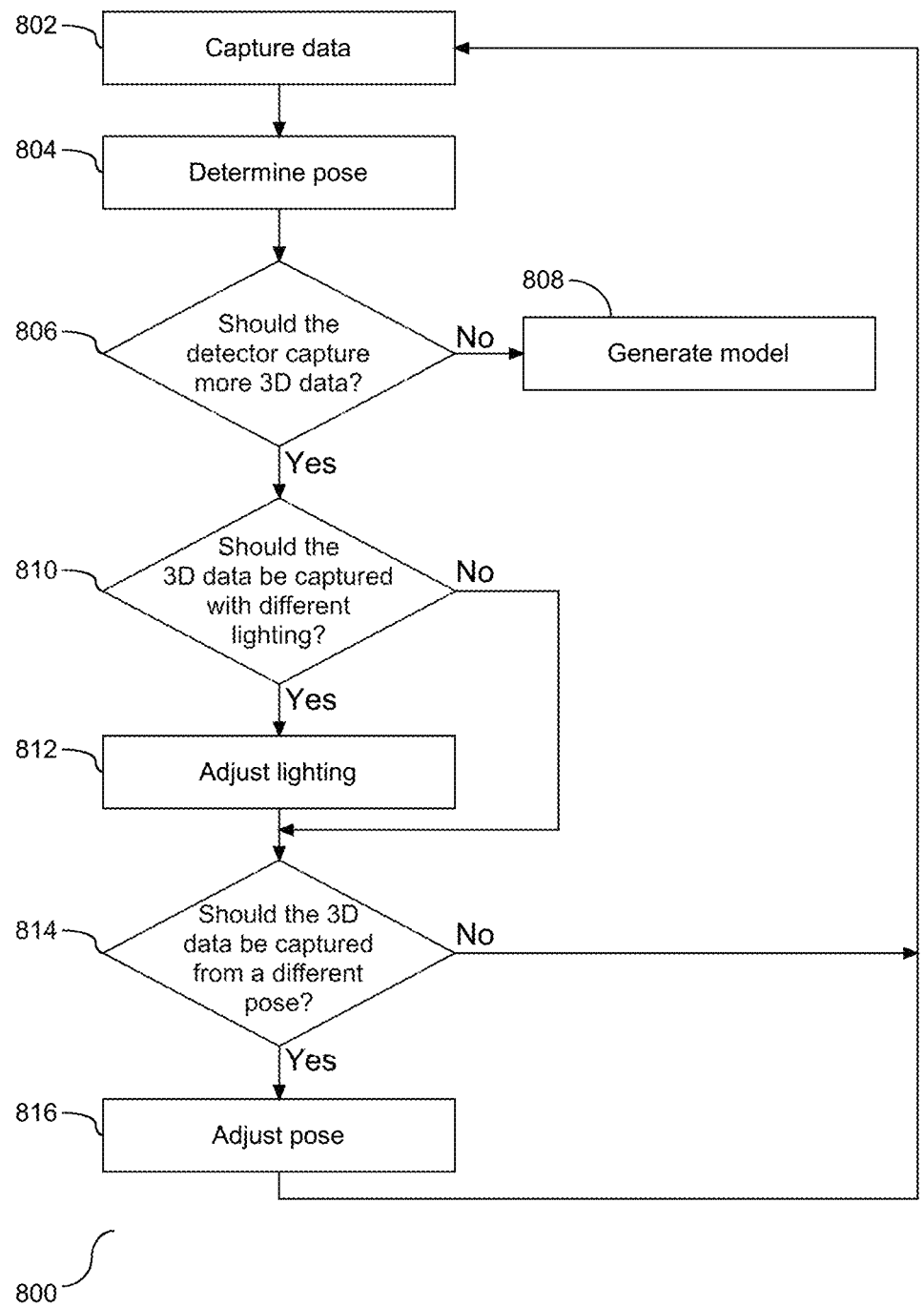
FIG. 8 depicts a flow chart illustrating a method for adjusting a system parameter based on the identified pose of the detector.

FIGS. 6-7 illustrate resolution of exceptions throughout the process of capturing 3D data and generating a model. Referring to FIG. 8, a flow chart (800) is provided illustrating a method for adjusting a system parameter based on the identified pose of the detector. As shown, 3D data of the body and/or object is captured by a detector in a select pose (802). The select pose of the detector is identified utilizing the captured 3D data (804). Following step (804), it is determined if the detector should capture additional 3D data (806). If at step (808) it is determined that additional data is not necessary, the process proceeds to step (808) to generate a model from the captured 3D data. However, following a positive response to the determination at step (806), it is further determined if the additional 3D data should be captured with different lighting (810). A positive response to the determination at step (810) is followed by an adjustment of the lighting (812). The determination at step (810) and adjustment at step (812) lighting may be based on a lighting rule. Accordingly, as demonstrated, the 3D data capture and evaluation may include dynamic adjustments to the lighting.

Following adjustment of the lighting at step (812) or a negative response to the determination at step (810), it is determined if the 3D data should be captured from a different pose (814). A positive response to the determination at step (814) is followed by an adjustment of the pose of the detector relative to the body (e.g., movement of the detector and/or body) (816). The determination at step (814) and the adjustment at step (816) may be based on a detector pose rule. Following either the adjustment of the pose (816) or a negative response to the determination at step (814), the process returns to step (804) to capture additional 3D data of the body and/or object including utilizing any adjustment to the lighting and/or pose of the detector relative to the body in the additional data capture. Accordingly, the system may dynamically adjust the lighting, the detector, and/or the body based on one or more rules throughout capturing and processing of 3D data.

Figure 9:
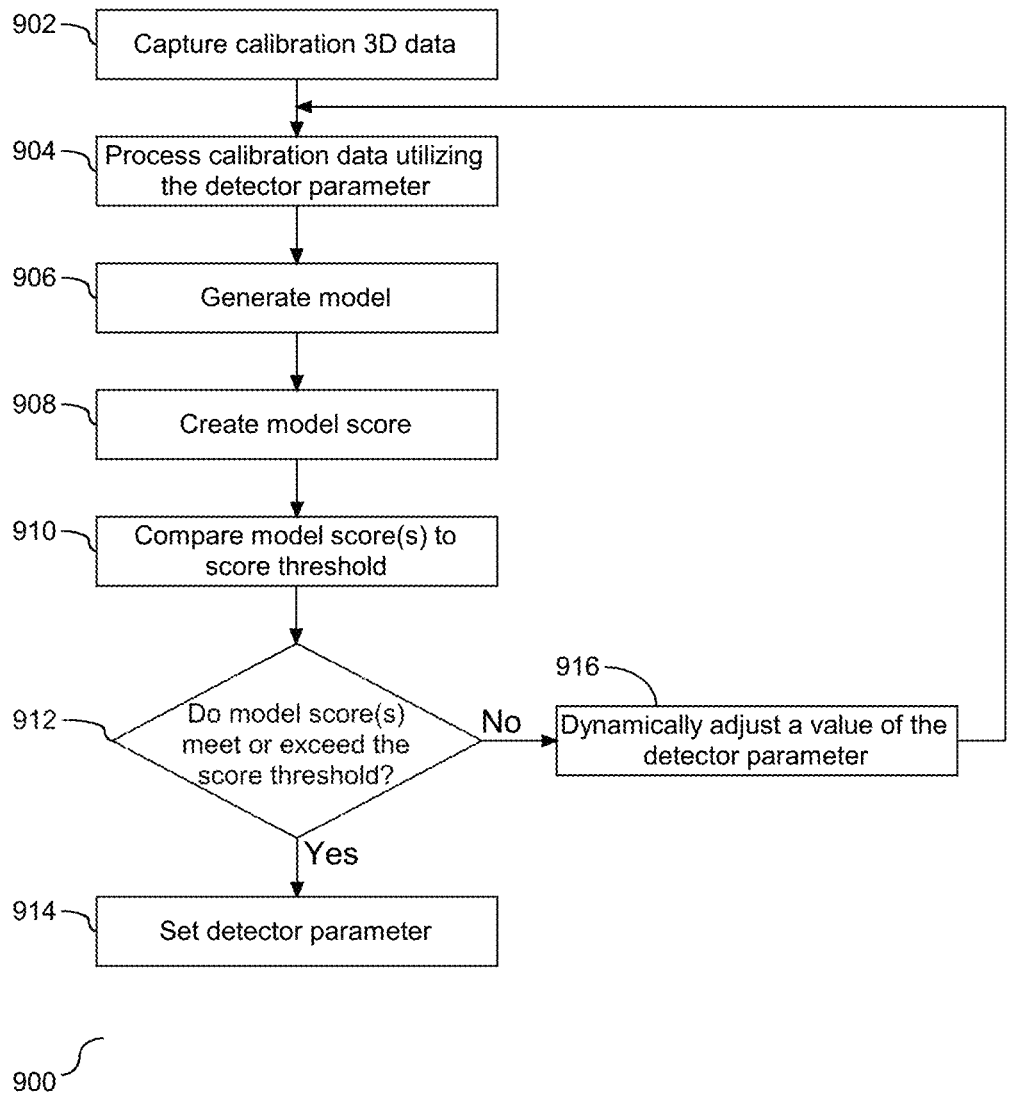
FIG. 9 depicts a flow chart illustrating a method for dynamic calibration of the detector.

FIGS. 1-8 illustrate embodiments of capturing 3D data utilizing a detector. Referring to FIG. 9, a flow chart (900) is provided illustrating a method for dynamic calibration of the detector. As shown, 3D data of the body and/or object is captured and designated as calibration data (902). In one embodiment, the object is a calibration object. The calibration data is processed utilizing a select value for a detector parameter (904). In one embodiment the select value is the default value (e.g., factory setting) for the detector. The detector parameter may be, but is not limited to, a focal length of a sensor, a FOV, a disparity (e.g., a depth offset), a pixel mapping, a transform, and a distortion vector, a baseline. Following processing of the calibration 3D data, a model is generated from the processed calibration data (906). The model is scored based on the quality of the model (908). The quality of the model relates to an alignment of the processed calibration data. For example, the score may include a comparison of a first value of a first voxel from a first 3D data and a second value of the first voxel from a second 3D data. Accordingly, calibration data is captured and processed in order to create a model and generate a model score.

The model score and any prior model score(s) are evaluated including a comparison of the model score(s) to a score threshold (910). Based on the model score comparison, it is determined if the model score(s) meets or exceeds the score threshold (912). If the determination is positive at step (912), the current detector parameter is set as the calibrated detector parameter. However, if the determination at step (912) is negative and the model score(s) are below the score threshold, the value of the detector parameter is dynamically adjusted (916). The dynamic adjustment includes changing the value of the detector parameter based on a calibration rule. In one embodiment, the calibration rule is a randomized gradient descent algorithm. Following the dynamic adjustment at step (916) the calibration data is re-processed with the dynamically adjusted value for the detector parameter at step (904). The process continues the dynamic adjustment until the model score based on the model generated from the adjusted value of the detector parameter meets or exceeds the score threshold. In one embodiment, the process continues the dynamic adjustment until the model score is optimized by dynamically adjusting the value of the detector parameter until the value converges to a single value or value(s) within a predefined range. Accordingly, the detector may be dynamically calibrated utilizing a calibration data set and a model score.

Aspects of 3D scanning including dynamic detector pose identification utilizing fiducials, as shown and described in FIGS. 1-9 employ one or more functional tools to support 3D scanning and dynamic detector pose identification. Aspects of the functional tools, e.g. creator, configuration data, calibration module, etc., and their associated functionality may be embodied in a computer system/server in a single location, or in one embodiment, may be configured in a cloud based system sharing computing resources. With references to FIG. 10, a block diagram (1000) is provided illustrating an example of a computer system/server (1002), hereinafter referred to as a host (1002) in communication with a cloud based support system, to implement the system and processes described above with respect to FIGS. 1-9. Host (1002) is operational with numerous other general purpose or special purpose computing system environments or configurations. Examples of well-known computing systems, environments, and/or configurations that may be suitable for use with host 1002) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (1002) may be described in the general context of computer system-executable instructions, such as program modules, being executed by a computer system. Generally, program modules may include routines, programs, objects, components, logic, data structures, and so on that perform particular tasks or implement particular abstract data types. The host (1002) may be practiced in distributed cloud computing environments where tasks are performed by remote processing devices that are linked through a communications network. In a distributed cloud computing environment, program modules may be located in both local and remote computer system storage media including memory storage devices.

Figure 10:
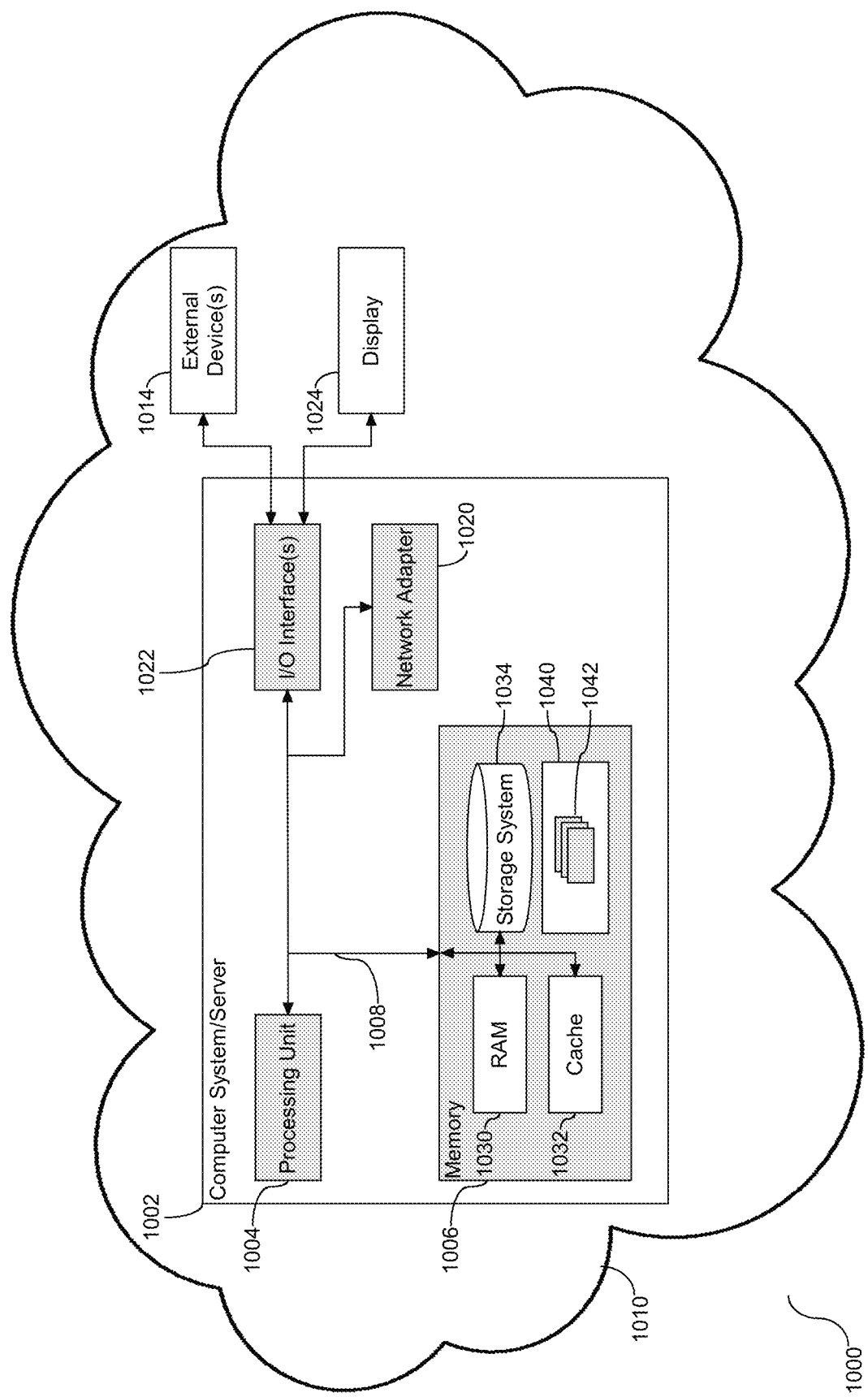
FIG. 10 is a block diagram illustrating an example of a computer system/server of a cloud based support system, to implement the system and process described above with respect to FIGS. 1-9.

As shown in FIG. 10, the host (1002) is shown in the form of a general-purpose computing device. The components of the host (1002) may include, but are not limited to, one or more processors or processing units (1004), a system memory (1006), and a bus (1008) that couples various system components including system memory (1006) to processor (1004). The bus (1008) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1002) typically includes a variety of computer system readable media. Such media may be any available media that is accessible by the host (1002) and it includes both volatile and non-volatile media, removable and non-removable media.

The memory (1006) can include computer system readable media in the form of volatile memory, such as random access memory (RAM) (1030) and/or cache memory (1032). By way of example only, storage system (1034) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1008) by one or more data media interfaces.

Program/utility (1040), having a set (at least one) of program modules (1042), may be stored in the memory (1006) by way of example, and not limitation, as well as an operating system, one or more application programs, other program modules, and program data. Each of the operating systems, one or more application programs, other program modules, and program data or some combination thereof, may include an implementation of a networking environment. The program modules (1042) generally carry out the functions and/or methodologies of embodiments to store and analyze data. For example, the set of program modules (1042) may include the modules configured as a creator and/or calibration module in order to dynamically identify a detector pose and generate a model as in FIGS. 1-9.

The host (1002) may also communicate with one or more external devices (1014), such as a keyboard, a pointing device, etc.; a display (1024); one or more devices that enable a user to interact with host (1002); and/or any devices (e.g., network card, modem, etc.) that enable host (1002) to communicate with one or more other computing devices. Such communication can occur via Input/Output (I/O) interface(s) (1022). Still yet, host (1002) can communicate with one or more networks such as a local area network (LAN), a general wide area network (WAN), and/or a public network (e.g., the Internet) via network adapter (1020). As depicted, network adapter (1020) communicates with the other components of host (1002) via bus (1008). In one embodiment, a plurality of nodes of a distributed file system (not shown) is in communication with the host (1002) via the I/O interface (1022) or via the network adapter (1020). It should be understood that although not shown, other hardware and/or software components could be used in conjunction with host (1002). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1006), including RAM (1030), cache (1032), and storage system (1034), such as a removable storage drive and a hard disk installed in a hard disk drive.

Computer programs (also called computer control logic) are stored in memory (1006). Computer programs may also be received via a communication interface, such as network adapter (1020). Such computer programs, when run, enable the computer system to perform the features of the present embodiments as discussed herein. In particular, the computer programs, when run, enable the processing unit (1004) to perform the features of the computer system. Accordingly, such computer programs represent controllers of the computer system.

In one embodiment, the host (1002) is a node (1010) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
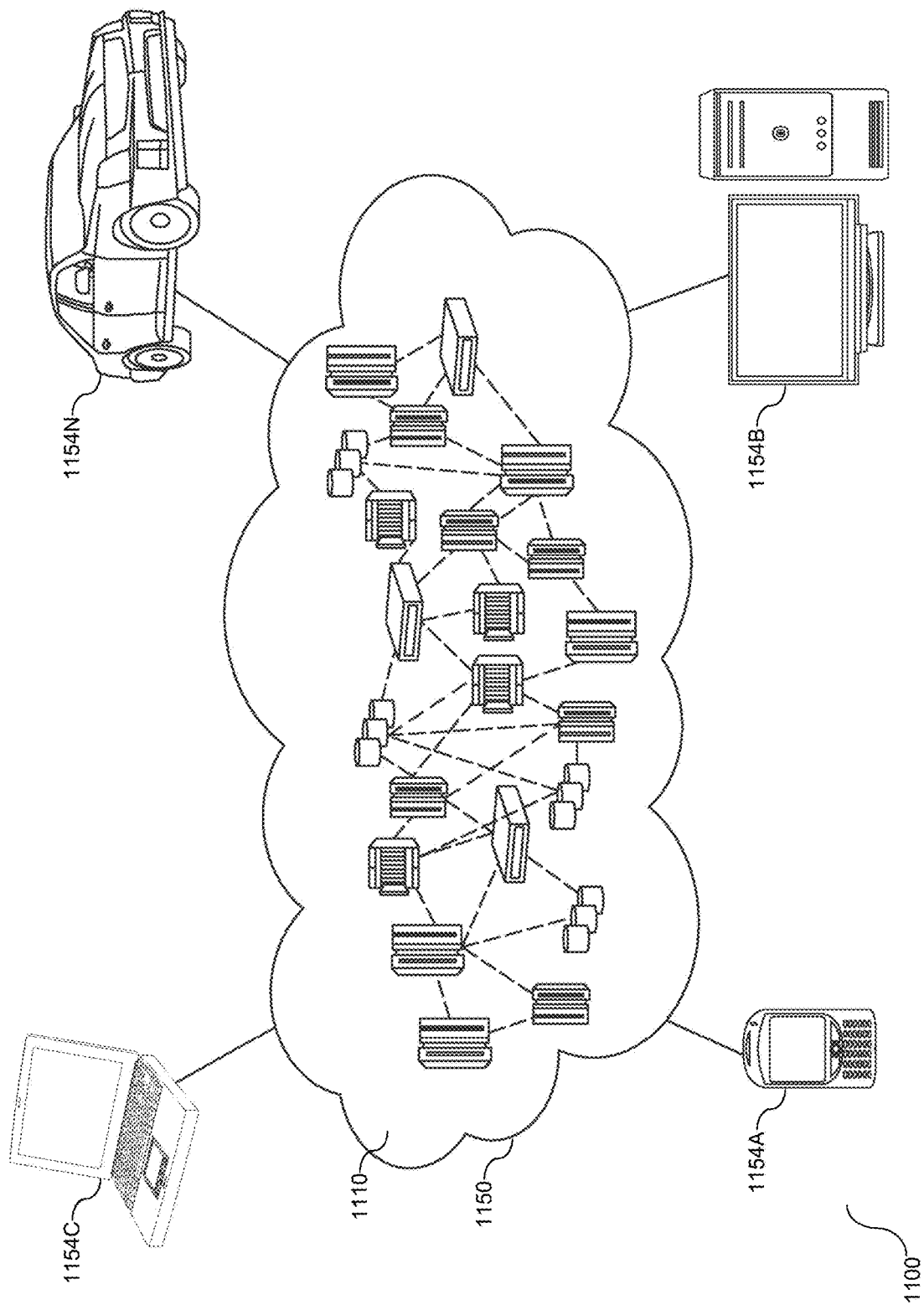
FIG. 11 depicts a block diagram illustrating a cloud computing environment.

Referring now to FIG. 11, an illustrative cloud computing network (1100) is provided. As shown, cloud computing network (1100) includes a cloud computing environment (1150) having one or more cloud computing nodes (1110) with which local computing devices used by cloud consumers may communicate. Examples of these local computing devices include, but are not limited to, personal digital assistant (PDA) or cellular telephone (1154A), desktop computer (11549), laptop computer (1154C), and/or automobile computer system (1154N). Individual nodes within nodes (1110) may further communicate with one another. They may be grouped (not shown) physically or virtually, in one or more networks, such as Private, Community, Public, or Hybrid clouds as described hereinabove, or a combination thereof. This allows cloud computing environment (1100) to offer infrastructure, platforms and/or software as services for which a cloud consumer does not need to maintain resources on a local computing device. It is understood that the types of computing devices (1154A-N) shown in FIG. 11 are intended to be illustrative only and that the cloud computing environment (1150) can communicate with any type of computerized device over any type of network and/or network addressable connection (e.g., using a web browser).

Figure 12:
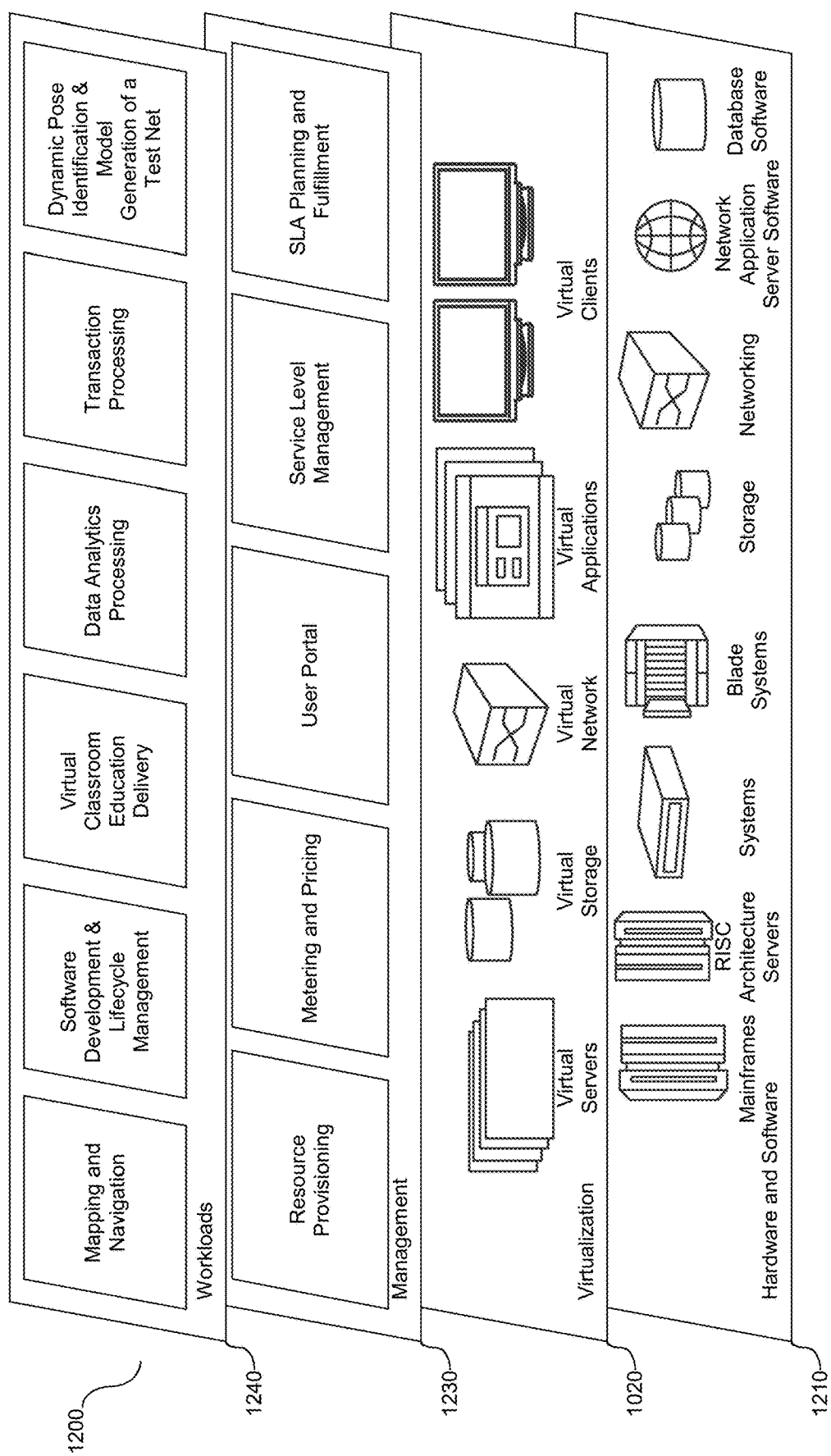
FIG. 12 depicts a block diagram illustrating a set of functional abstraction model layers provided by the cloud computing environment.

Referring now to FIG. 12, a set of functional abstraction layers (1200) provided by the cloud computing network of FIG. 11 is shown. It should be understood in advance that the components, layers, and functions shown in FIG. 12 are intended to be illustrative only, and the embodiments are not limited thereto. As depicted, the following layers and corresponding functions are provided: hardware and software layer (1210), virtualization layer (1220), management layer (1230), and workload layer (1240). The hardware and software layer (1210) includes hardware and software components. Examples of hardware components include mainframes; RISC (Reduced Instruction Set Computer) architecture based servers; networks and networking components. Examples of software components include network application server software; and database software.

Virtualization layer (1220) provides an abstraction layer from which the following examples of virtual entities may be provided: virtual servers; virtual storage; virtual networks, including virtual private networks; virtual applications and operating systems; and virtual clients.

In one example, management layer (1230) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1240) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic pose determination and model generation.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium includes a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium is any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two Hocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Fiducials are positioned in communication with a body and recognized within captured 3D data utilized for model generation thereby increasing the quality of the generated model and/or 3D mesh.

It will be appreciated that, although specific embodiments have been described herein for purposes of illustration, various modifications may be made without departing from the spirit and scope of the embodiments. In particular, any detector type may be utilized. In one embodiment, a plurality of different body configurations may be used. For example, the body may be circular, triangular, square, pentagonal, etc. Additionally, the 3D data format type should not be considered limiting. The 3D mesh generated from 3D data of the body and/or body may be utilized by a manufacturing device (e.g., 3D printer) to create a physical replica of the body and/or object. Accordingly, the scope of protection of these embodiments is limited only by the following claims and their equivalents.

What is claimed is:

1. A system comprising:
    a first body having two or more fiducials operatively coupled to the first body, each fiducial having a first position relative to the first body and each fiducial having a corresponding identifier;
    a motor configured to facilitate movement of the first body;
    configuration data operatively coupled to a creator, the configuration data including the identifier and the first position of the two or more fiducials;
    a detector configured to capture two or more model data of the first body including a first data in a first pose of the detector and a second data in a second pose of the detector, wherein the second pose is different from the first pose; and
    the creator operatively coupled to the detector, the creator configured to:
        identify at least two fiducials of the two or more fiducials within the captured first and second data, including the identifier of each identified fiducial;
        determine an observed position of each identified fiducial relative to the detector for the first and second data;
        compare the determined observed position from the first and second data to the configuration data, including the first position, based on the identifier of the identified at least two fiducials within the first and second data;

identify the first and second pose of the detector relative to the first body based on each comparison;

generate pose data based on the identified first and second pose; and augment the first and second data with the respective generated pose data;

generate a first model from the model data including the augmented first and second data;

determine a translation between the first pose and the second pose; and wherein the speed of the motor is adjusted based on the identified translation.

2. The system of claim 1, wherein a movement of the first body is continuous from a first time before the capture of the first data to a second time after the capture of the second data.

3. The system of claim 1, further comprising:
a plurality of teeth positioned in communication with a perimeter of the first body; and
the motor having a gear configured to engage the teeth to facilitate movement of the first body.

4. The system of claim 1, further comprising:
the creator to identify an exception in the first model;
the motor to move the first body to a select position in response to the identified exception, wherein the select position supports the detector to capture a third data of the first body from a third pose; and
the creator to generate a second model from the first model and the captured third data, including the third data to resolve the exception of the first model.

5. The system of claim 1, further comprising:
replacement of the first body with a second body, wherein the second body has a different size than the first body; and
the motor configured to change position in support of receipt of the second body, and the detector configured to capture a fourth data of the second body in a fourth pose.

6. The system of claim 1, further comprising:
a plurality of ball wheels in communication with the first body, the wheel balls to physically support and facilitate movement of the first body.

7. The system of claim 1, further comprising:
a pivot positioned proximal to the first body, the pivot configured to facilitate a rotation of the first body around an axis perpendicular to a plane of the first body.

8. The system of claim 1, further comprising:
a robotic device in communication with the detector, the robotic device configured to facilitate movement of the detector in at least three degrees of freedom.

9. The system of claim 8, further comprising:
the creator to identify an exception in the first model; and
the robotic device to move the detector to a select position in response to the identified exception, wherein the select position supports the detector to capture a third data of the first body from a third pose; and
a second model, generated by the creator, the second model generated from the first model and the captured third data, including the third data to resolve the exception of the first model.

10. The system of claim 1, wherein the detector is selected from the group consisting of a stereo camera, a camera and distance sensor pair, and a structured light camera system.

11. The system of claim 10, wherein the first data is pixel data coupled with distance data.

12. The system of claim 1, further comprising the creator to generate a three-dimensional mesh from the first model.

13. The system of claim 1, further comprising a light source and wherein the first and second captured data include color data and further comprising the creator to:
adjust the light source based on at least one of the determined first pose and the determined second pose;
the detector configured to capture a third data of the first body utilizing the adjusted light source; and
a second model, generated by the creator, the second model generated from the first model and the captured third data, including the third data to adjust a color of the first model.

14. The system of claim 13, further comprising the creator to:
determine lighting of the first model utilizing the first and second pose data, wherein the creator to adjust the light source is based on the determined lighting.

15. The system of claim 1, wherein the first and second captured data include color data and further comprising the creator to:
determine lighting of the first model utilizing the first and second pose data; and
a second model, generated by the creator, the second model generated from the first model, including to adjust a color of the first model based on the determined lighting.

16. The system of claim 1, further comprising the creator to:
identify an exception based on the augmented first data, wherein the exception is selected from the group consisting of: a speed of the first body relative to the detector meeting or exceeding a threshold, the first pose meeting or exceeding a pose threshold, position of an object, and detector field of view relative to the first object; and
present a notification based on the identified exception.

17. The system of claim 1, wherein at least one of the fiducials is an augmented reality tag.

18. A method comprising:
configuring a body having two or more fiducials operatively coupled to the body, each fiducial having a first position relative to the body and each fiducial having a corresponding identifier, wherein a motor is configured to facilitate movement of the first body;
arranging configuration data having the identifier and the first position of two or more fiducials;
capturing, by a detector, two or more model data of the body including a first date in a first pose of the detector and a second date in a second pose of the detector, wherein the second pose is different from the first pose;
identifying at least two fiducials of the two or more fiducials within the captured first and second data, including the identifier of each identified fiducial;
determining an observed position of each identified fiducial relative to the detector for the first and second data;
comparing the determined observed position from the first and second data to the configuration data, including the first position, based on the identifier of each identified fiducial within the first and second data;
identifying the first and second pose of the detector relative to the body based on each comparison;
generating pose data based on the identified first and second pose; and
augmenting the first and second data with the generated first pose data;

generating a first model from the model data including the augmented first and second data;
determine a translation between the first pose and the second pose; and
wherein the speed of the motor is adjusted based on the identified translation.

19. The method of claim 18, wherein a movement of the body is continuous from a first time before the capture of the first data to a second time after the capture of the second data.

20. The method of claim 18, further comprising:
an object in communication with the first surface, wherein the first and second data include three-dimensional data of the object; and
wherein generating the first model includes creating a three-dimensional mesh of the object.

21. The method of claim 18, further comprising:
identifying an exception in the three-dimensional mesh; and
responsive to the identification of the exception, capturing a third data of the body, including the object, from a third pose; and
generating a second model from the second model and the captured third data, including the third data to resolve the exception of the first model.

22. The method of claim 21, wherein the exception is selected from the group consisting of a gap, a misalignment, a protrusion, model quality, and a quantity of observations below a threshold.

23. The method of claim 18, wherein the first data is pixel data coupled with distance data.

24. The method of claim 18, wherein at least one of the fiducials is an augmented reality tag.

25. A system comprising:
a first body having two or more fiducials operatively coupled to the first body, each fiducial having a first position relative to the first body and each fiducial having a corresponding identifier;
a motor configured to facilitate movement of the first body;
configuration data operatively coupled to a creator, the configuration data including the identifier and the first position of the two or more fiducials;
a detector configured to capture two or more model data of the first body including a first data in a first pose of the detector and a second data in a second pose of the detector, wherein the second pose is different from the first pose; and
the creator operatively coupled to the detector, the creator configured to:
identify at least two fiducials of the two or more fiducials within the captured first and second data, including the identifier of each identified fiducial;
determine an observed position of each identified fiducial relative to the detector for the first and second data;
compare the determined observed position from the first and second data to the configuration data, including the first position, based on the identifier of the identified at least two fiducials within the first and second data;
identify the first and second pose of the detector relative to the first body based on each comparison;
generate pose data based on the identified first and second pose; and
augment the first and second data with the respective generated pose data;
generate a first model from the model data including the augmented first and second data;
the creator to identify an exception in the first model;
the motor to move the first body to a select position in response to the identified exception, wherein the select position supports the detector to capture a third data of the first body from a third pose; and
the creator to generate a second model from the first model and the captured third data, including the third data to resolve the exception of the first model.

* * * * *